(12) United States Patent
Jeong et al.

(10) Patent No.: US 11,086,497 B2
(45) Date of Patent: Aug. 10, 2021

(54) ELECTRONIC APPARATUS AND NOTIFICATION DISPLAYING METHOD FOR ELECTRONIC APPARATUS

(71) Applicant: SAMSUNG ELECTRONICS CO., LTD., Suwon-si (KR)

(72) Inventors: Kyung-ho Jeong, Seoul (KR); Yong-gook Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 15/370,283

(22) Filed: Dec. 6, 2016

(65) Prior Publication Data
US 2017/0177200 A1    Jun. 22, 2017

(30) Foreign Application Priority Data

Dec. 16, 2015 (KR) .................. 10-2015-0180331

(51) Int. Cl.
*G06F 3/0482* (2013.01)
*G06F 3/0484* (2013.01)
(Continued)

(52) U.S. Cl.
CPC ........ *G06F 3/04845* (2013.01); *G06F 3/0482* (2013.01); *G06F 3/04842* (2013.01);
(Continued)

(58) Field of Classification Search
CPC ............... G06F 3/0482; G06F 3/04842; G06F 3/04883; G06F 3/04845;
(Continued)

(56) References Cited

U.S. PATENT DOCUMENTS

| 6,542,868 B1 * | 4/2003 | Badt ................. G10L 13/00 704/270 |
| 8,463,244 B2 | 6/2013 | Kim et al. |

(Continued)

FOREIGN PATENT DOCUMENTS

| CN | 103648084 A | 3/2014 |
| CN | 103813001 A | 5/2014 |

(Continued)

OTHER PUBLICATIONS

Search Report and Written Opinion dated Mar. 15, 2017 in counterpart International Patent Application No. PCT/KR2016/014198.
(Continued)

*Primary Examiner* — Kyle R Stork
(74) *Attorney, Agent, or Firm* — Nixon & Vanderhye P.C.

(57) ABSTRACT

An electronic apparatus is provided, which includes a display configured to display notification information, a memory configured to store a notification display option of an application that generates the notification information, and a processor configured to control the display to display the notification information based on the notification display option of the application, wherein, when an interaction regarding the notification information is generated, the processor is configured to change the notification display option of the application stored in the memory based on a type of the interaction.

19 Claims, 26 Drawing Sheets

(51) Int. Cl.
*G09G 5/14* (2006.01)
*G06F 3/0488* (2013.01)
*H04M 1/72403* (2021.01)
*G09G 5/37* (2006.01)

(52) U.S. Cl.
CPC ........... *G06F 3/04883* (2013.01); *G09G 5/14* (2013.01); *G09G 5/37* (2013.01); *H04M 1/72403* (2021.01); *G06F 2203/04808* (2013.01)

(58) Field of Classification Search
CPC .. G06F 2203/04808; G09G 5/14; G09G 5/37; H04M 1/7522; H04M 1/72403
See application file for complete search history.

(56) References Cited

U.S. PATENT DOCUMENTS

| | | | |
|---|---|---|---|
| 2008/0194242 A1 | 8/2008 | Park et al. | |
| 2011/0088003 A1* | 4/2011 | Swink | H04L 51/32 715/863 |
| 2012/0304118 A1 | 11/2012 | Donahue et al. | |
| 2013/0346882 A1 | 12/2013 | Shiplacoff et al. | |
| 2014/0179377 A1* | 6/2014 | Song | H04W 4/20 455/566 |
| 2014/0201655 A1 | 7/2014 | Mahaffey et al. | |
| 2014/0223372 A1* | 8/2014 | Dostie | G06F 3/0482 715/813 |
| 2014/0229880 A1 | 8/2014 | Aradhye et al. | |
| 2014/0304616 A1 | 10/2014 | Park et al. | |
| 2015/0113457 A1 | 4/2015 | Li et al. | |
| 2015/0177970 A1* | 6/2015 | Choi | G06F 3/0488 715/752 |
| 2015/0188871 A1* | 7/2015 | Lewis | H04L 51/24 709/207 |
| 2015/0350147 A1* | 12/2015 | Shepherd | H04L 51/24 715/752 |
| 2016/0085397 A1* | 3/2016 | Jain | G06F 3/0488 715/828 |
| 2016/0330313 A1 | 11/2016 | Li et al. | |
| 2018/0101297 A1* | 4/2018 | Yang | H04M 1/72522 |

FOREIGN PATENT DOCUMENTS

| | | |
|---|---|---|
| EP | 2 096 840 | 9/2009 |
| KR | 10-2012-0060570 | 6/2012 |
| KR | 10-2014-0080898 A | 7/2014 |
| KR | 10-2015-0039999 | 4/2015 |
| KR | 10-2015-0084579 | 7/2015 |
| KR | 10-2015-0112301 | 10/2015 |
| KR | 10-2015-0112331 | 10/2015 |
| WO | WO 2014/182082 | 11/2014 |
| WO | WO 2015/106397 | 7/2015 |

OTHER PUBLICATIONS

Extended European Search Report dated Jun. 15, 2018 for EP Application No. 16 875 960.3.
European Examination Report dated Mar. 21, 2019 for EP Application No. 16875960.3.
Korean Office Action dated Nov. 13, 2019 for KR Application No. 10-2015-0180331.
Chinese Office Action dated Jan. 14, 2020 for CN Application No. 201680073384.7.
Summons to attend Oral Hearings dated Feb. 3, 2020 for EP Application No. 16875960.3.
Korean Notice of Allowance dated Apr. 23, 2020 for Korean Application No. 10-2015-0180331.
Chinese Office Action dated Sep. 30, 2020 for CN Application No. 201680073384.7.
EP Result of Consultation dated Sep. 2, 2020 for EP Application No. 16875960.3.
Chinese Office Action dated Feb. 26, 2021 for CN Application No. 201680073384.7.

* cited by examiner

FIG. 7A
FIG. 7B
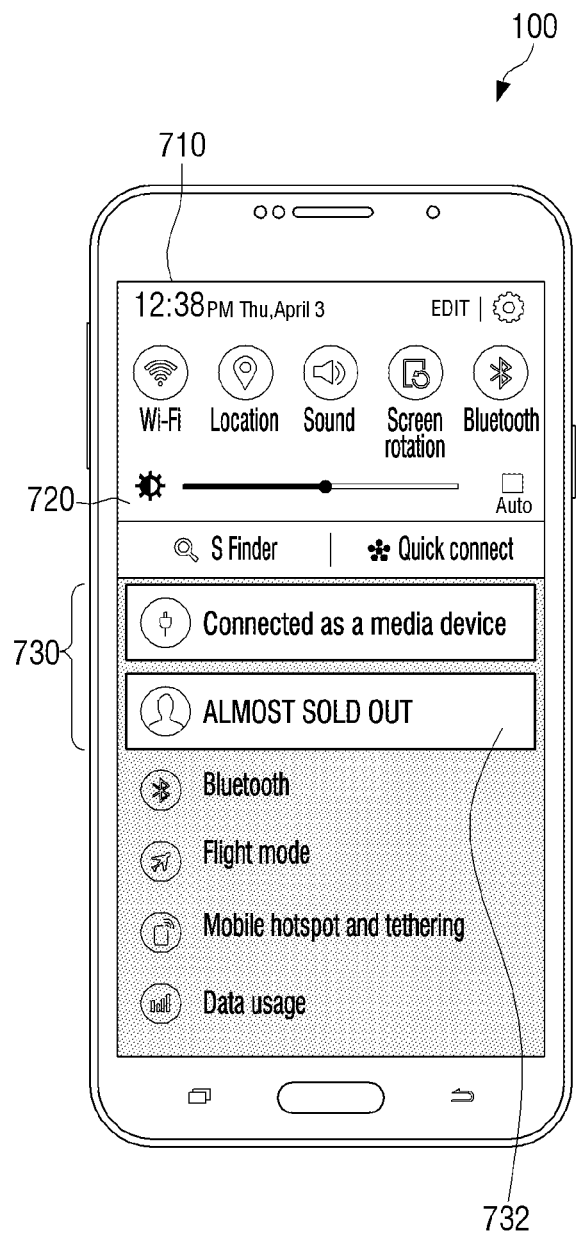
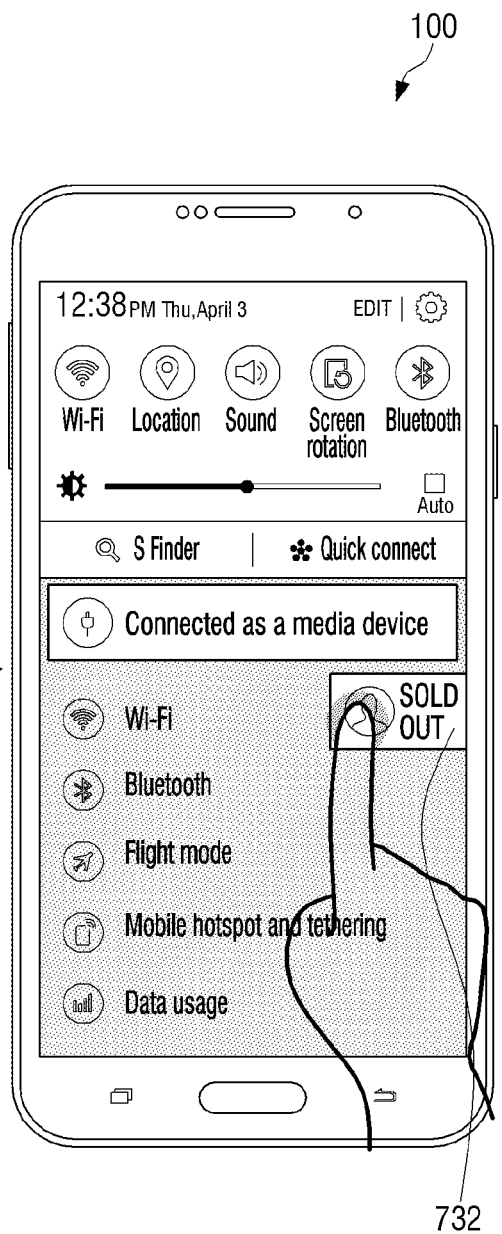

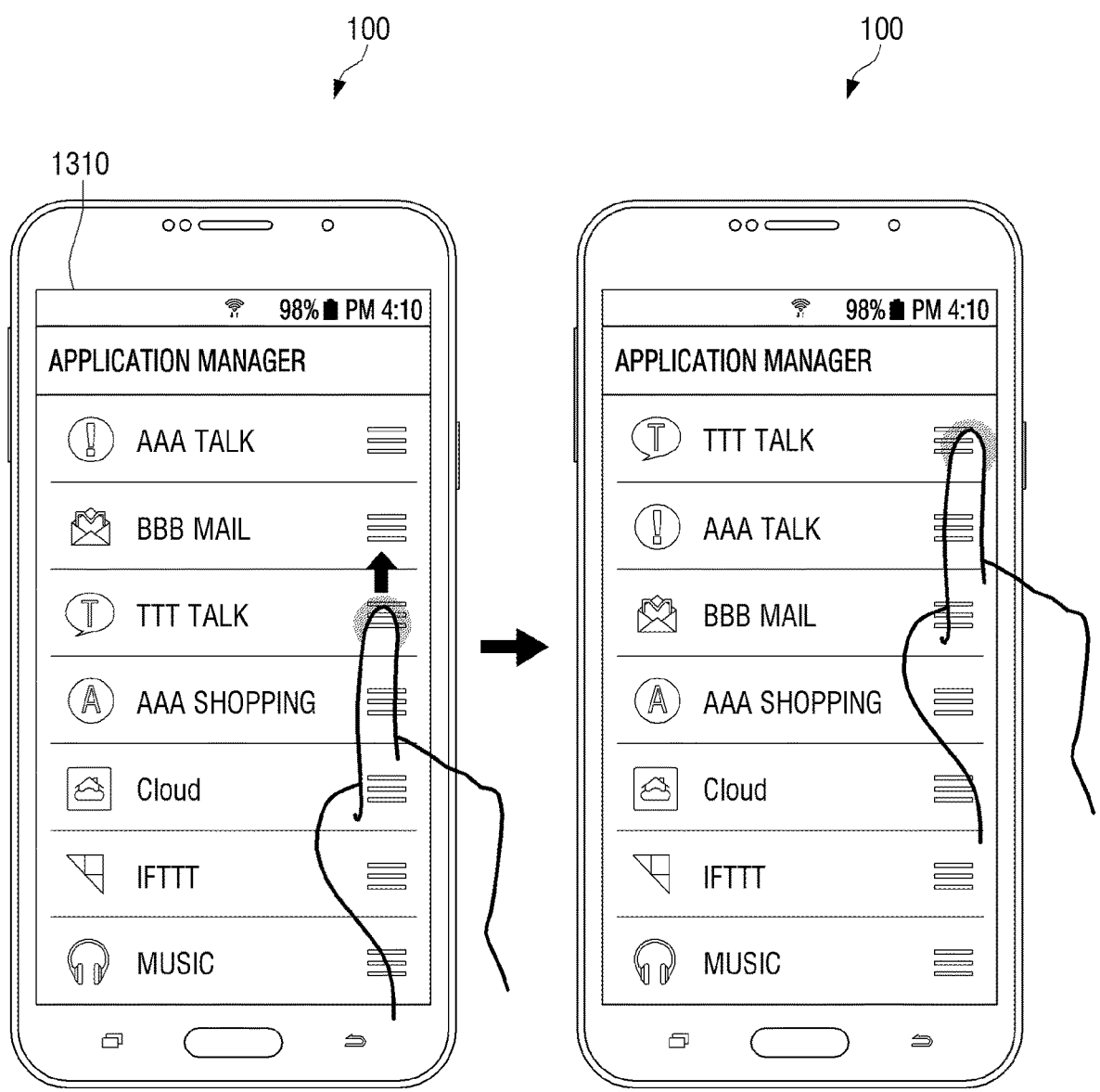

FIG. 16A
FIG. 16B
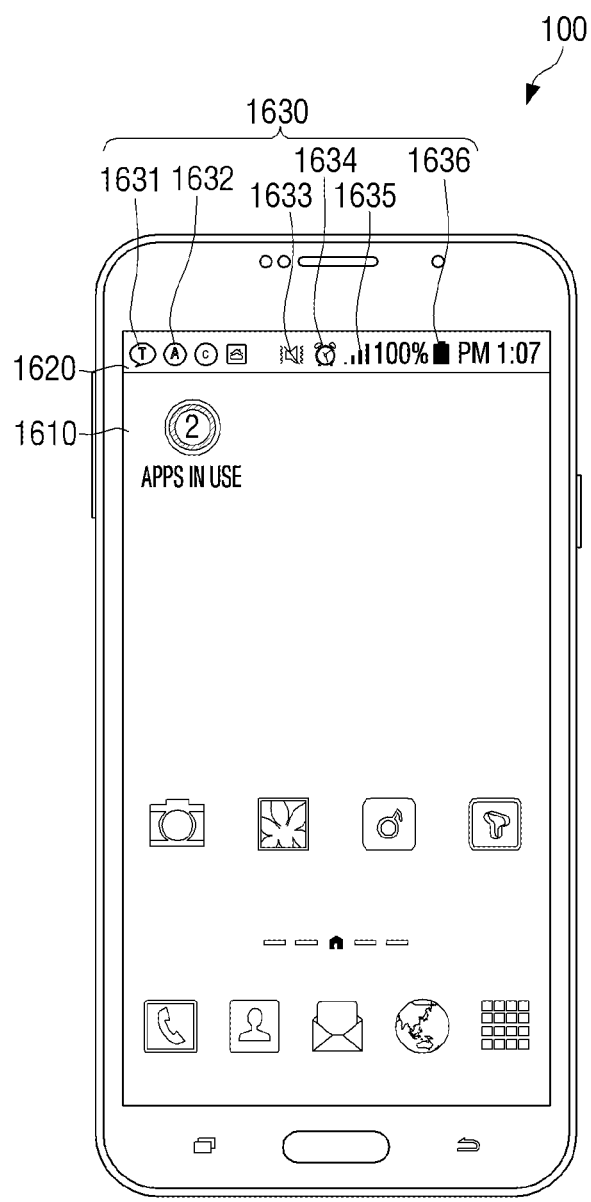
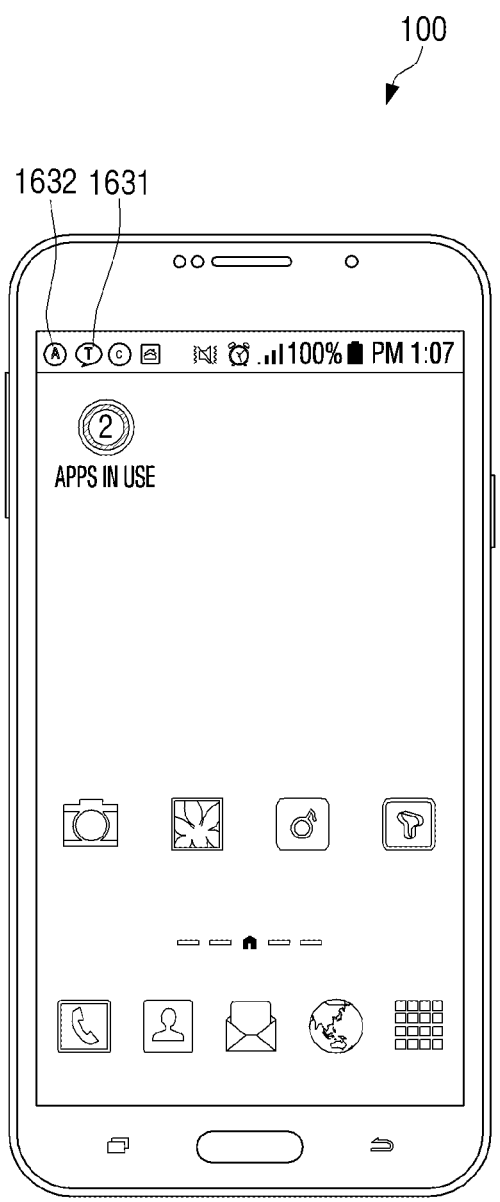

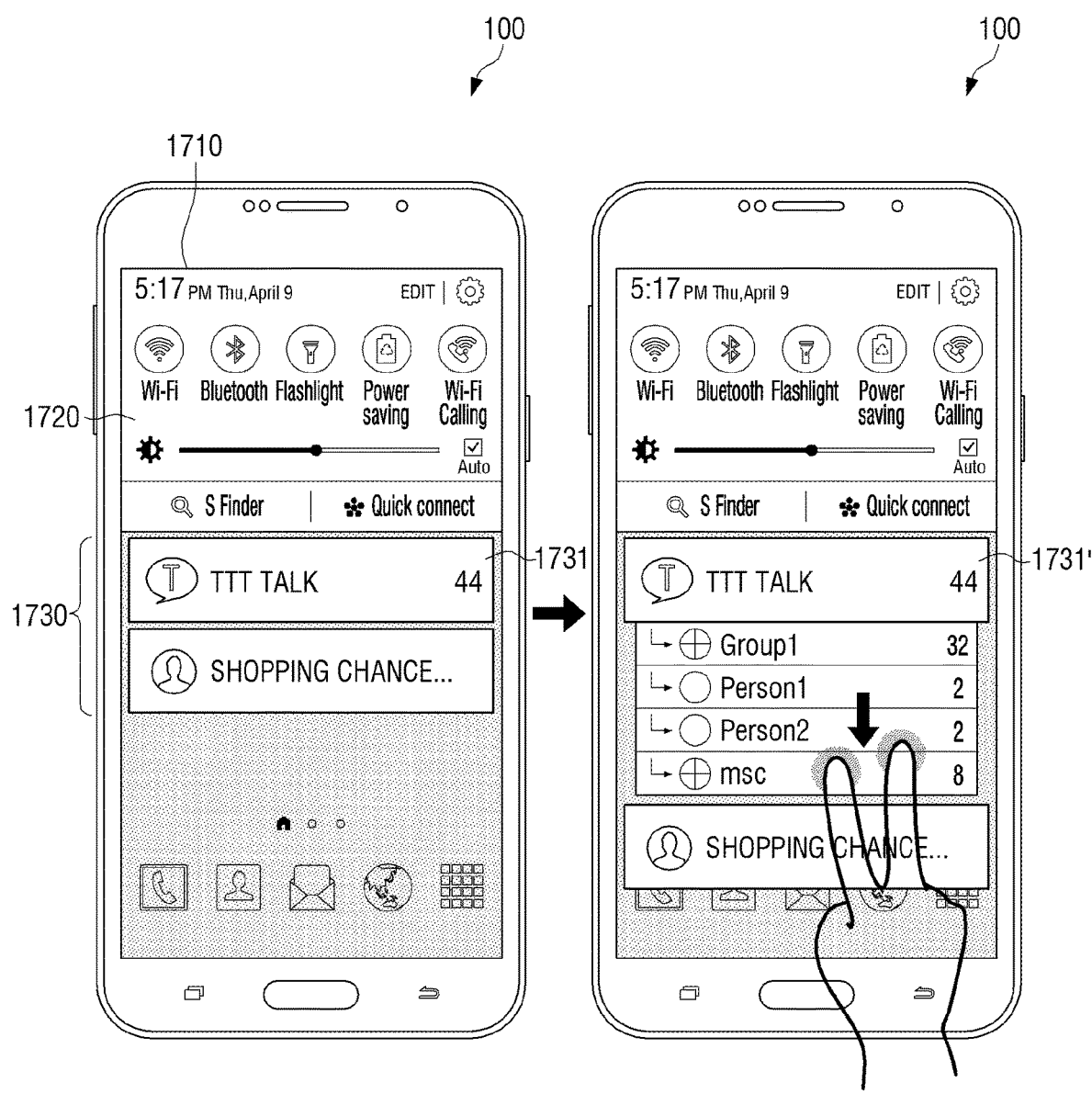

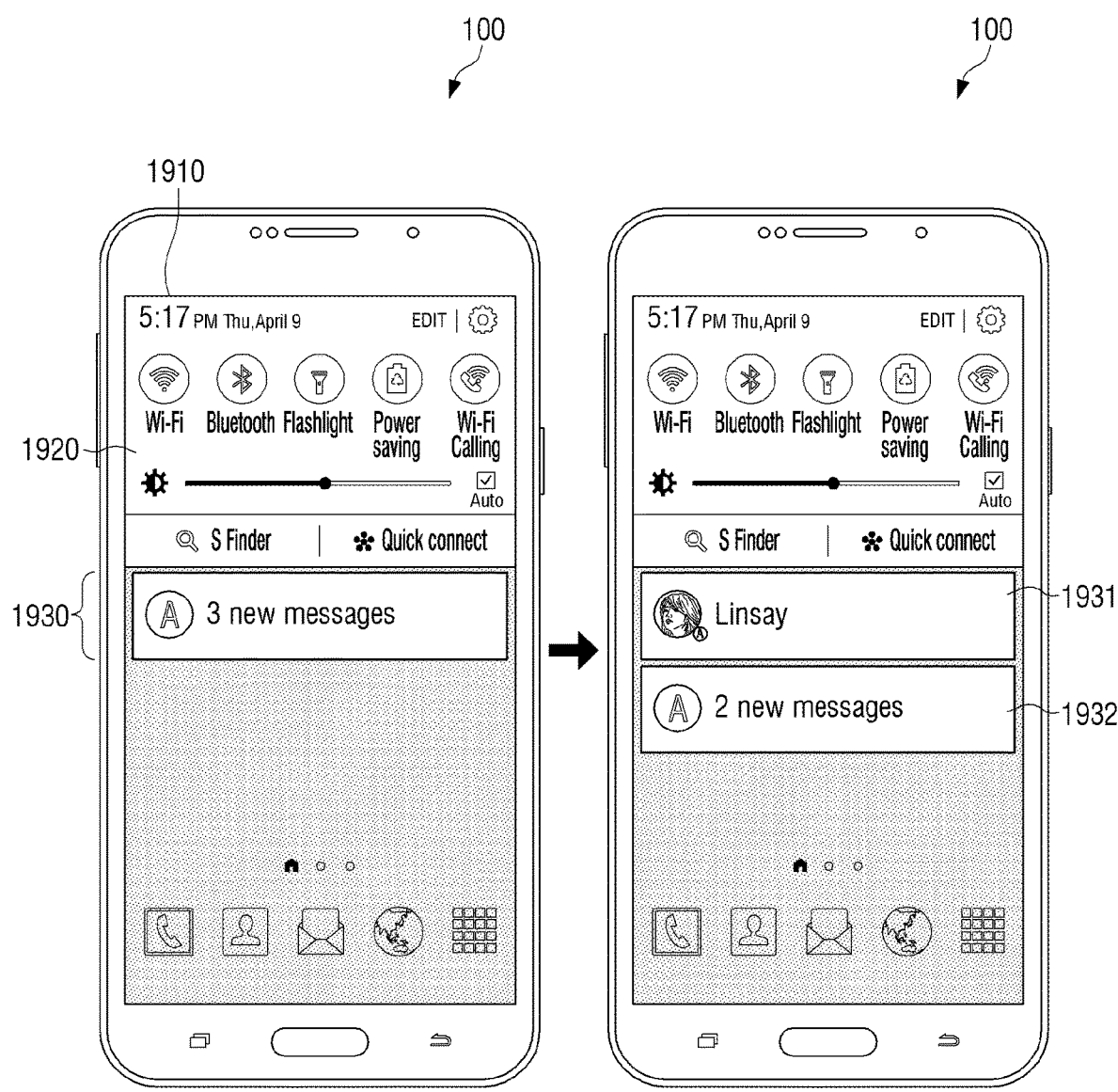

ELECTRONIC APPARATUS AND NOTIFICATION DISPLAYING METHOD FOR ELECTRONIC APPARATUS

CROSS-REFERENCE TO RELATED APPLICATION

This application is based on and claims priority under 35 U.S.C. § 119 to Korean Patent Application No. 10-2015-0180331, filed on Dec. 16, 2015 in the Korean Intellectual Property Office, the disclosure of which is incorporated by reference herein in its entirety.

BACKGROUND

1. Field

The present disclosure relates generally to an electronic apparatus capable of displaying a notification, and a notification displaying method thereof, and for example, to an electronic apparatus which displays notification differently based on user interactions to the notification, and a notification displaying method thereof.

2. Description of Related Art

Recent electronic apparatuses can install various types of applications. The applications include some that are already installed by the manufacturers of the electronic apparatuses, and various other applications that are downloaded from external servers and installed on the electronic apparatuses.

Accordingly, compared to the past when the electronic apparatuses display a limited range of notifications such as current status change notification, new text message reception notification, and so on, the electronic apparatuses nowadays can display notifications generated from numerous applications.

As the electronic apparatuses display increased amount of notifications, it is becoming more difficult for a user to find the desired notification. Accordingly, a method is necessary, which can more efficiently provide a plurality of notifications displayed on an electronic apparatus.

SUMMARY

Example embodiments of the present disclosure address the above disadvantages among other things According to an example embodiment, an electronic apparatus capable of analyzing user interactions regarding a plurality of notifications and displaying the same with efficacy and convenience are provided.

According to an example embodiment, an electronic apparatus is provided, which may include a display configured to display notification information, a memory configured to store a notification display option of an application that generates the notification information, and a processor configured to control the display to display the notification information based on the notification display option of the application. When a user interaction regarding the notification information is generated, the processor may change the notification display option of the application stored in the memory based on a type of the user interaction.

In an example embodiment, the notification display option of the application may include at least one of changing a form of notification information, displaying additional notification information, grouping a plurality of notification information, and changing a content of displayed notification information.

In an example embodiment, changing the form of notification information may include at least one of: displaying at least one notification information displayed on the display such that the notification information is distinguished from other notification information; changing an order of displaying the notification information; separating a portion of the content included in the notification information and displaying the separated portion as separate notification information; and changing an intensity of vibration or sound of the electronic apparatus that generates the notification information.

In an example embodiment, grouping the plurality of notification information may include an operation of grouping different notification information displayed on the display and displaying the different notification information as one notification information.

In an example embodiment, the notification information may be notification information provided by the application, and when a first type of interaction is generated selectively regarding one of the notification information, the processor may increase a preference for an application that provides the selected notification information, and when a second type of interaction is generated selectively regarding one of the notification information, the processor may decrease the preference for an application that provides the selected notification information.

In an example embodiment, the first type of interaction may include a first interaction of selecting one of the notification information, and a second interaction of dragging one of the notification information in a first direction, and the second type of interaction may include a third interaction of dragging one of the notification information in a second direction, and a fourth interaction of selecting a delete menu to delete the notification information.

In an example embodiment, when the first interaction occurs, the processor may activate an application corresponding to the selected notification information, and when the second interaction occurs, the processor may display a content included in the notification information on the display.

In an example embodiment, when the third interaction occurs, the processor may delete the dragged notification information from the display, and when the fourth interaction occurs, the processor may delete the notification information displayed on the display from the display.

In an example embodiment, the operation of dragging in the first direction may include an operation of dragging the notification information displayed on the display in a downward direction, and the operation of dragging in the second direction may include dragging the notification information displayed on the display in a leftward or rightward direction.

In an example embodiment, a method for displaying a notification information of an electronic apparatus is provided, which may include displaying the notification information based on a notification display option of an application that generates the notification information, and when an interaction regarding the notification information is generated, changing the notification display option of the application based a type of the interaction.

In an example embodiment, the notification display option of the application may include at least one of: changing a form of notification information, displaying additional notification information, grouping a plurality of notification information, and changing a content of displayed notification information.

In an example embodiment, changing the form of notification information may include at least one of: displaying at least one notification information displayed on the display such that the notification information is distinguished from other notification information; changing an order of displaying the notification information; separating a portion of the content included in the notification information and displaying the separated portion as separate notification information; and changing an intensity of vibration or sound of the electronic apparatus that generates the notification information.

In an example embodiment, grouping the plurality of notification information may include grouping different notification information and displaying the different notification information as one notification information.

In an example embodiment, the notification information may be notification information provided by the application, and changing the notification display option of the application may include, when a first type of interaction is generated selectively regarding one of the notification information, increasing a preference for an application that provides the selected notification information, and when a second type of interaction is generated selectively regarding one of the notification information, decreasing the preference for an application that provides the selected notification information.

In an example embodiment, the first type of interaction may include a first interaction of selecting one of the notification information, and a second interaction of dragging one of the notification information in a first direction, and the second type of interaction may include a third interaction of dragging one of the notification information in a second direction, and a fourth interaction of selecting a delete menu to delete the notification information.

In an example embodiment, the method may additionally include, when the first interaction occurs, activating an application corresponding to the selected notification information, and when the second interaction occurs, displaying a content included in the notification information.

In an example embodiment, the operation of dragging in the first direction may include an operation of dragging the notification information displayed on the display in a downward direction, and the operation of dragging in the second direction may include dragging the notification information displayed on the display in a leftward or rightward direction.

In an example embodiment, the method may additionally include, when the third interaction occurs, deleting the dragged notification information from the display, and when the fourth interaction occurs, deleting the displayed notification information.

In an example embodiment, a non-transitory computer readable medium storing a program to execute a method for displaying notification information of an electronic apparatus is provided, in which the method for displaying the notification information may include displaying the notification information based on a notification display option of an application that generates the notification information, and when an interaction regarding the notification information is generated, changing the notification display option of the application based on a type of the user interaction.

According to various example embodiments including those described above, the electronic apparatus can reflect the user interaction regarding the notification information displayed on the display and display the various notification information efficiently and conveniently.

BRIEF DESCRIPTION OF THE DRAWINGS

The above and/or other aspects of the present disclosure will be more apparent from the following detailed description, taken in conjunction with the accompanying drawings, in which like reference numerals refer to like elements, and wherein:

FIGS. 7A and 7B are diagrams illustrating an example of a user deleting a notification from an electronic apparatus according to an exemplary embodiment of the present disclosure;

FIGS. 13A and 13B are diagrams illustrating an example of a user directly changing a preference for an application according to an example embodiment of the present disclosure;

FIGS. 16A and 16B are diagrams illustrating an example electronic apparatus changing an order of notification icons displayed on a status indicating bar by reflecting a result of preference, according to an example embodiment of the present disclosure;

FIGS. 17A and 17B are diagrams illustrating an example electronic apparatus providing an additional function to a notification by reflecting a result of preference, according to an example embodiment of the present disclosure;

FIGS. 19A and 19B are diagrams illustrating an example electronic apparatus changing a form of a notification by reflecting a result of preference according to an embodiment of the present disclosure;

DETAILED DESCRIPTION

Figure 1:
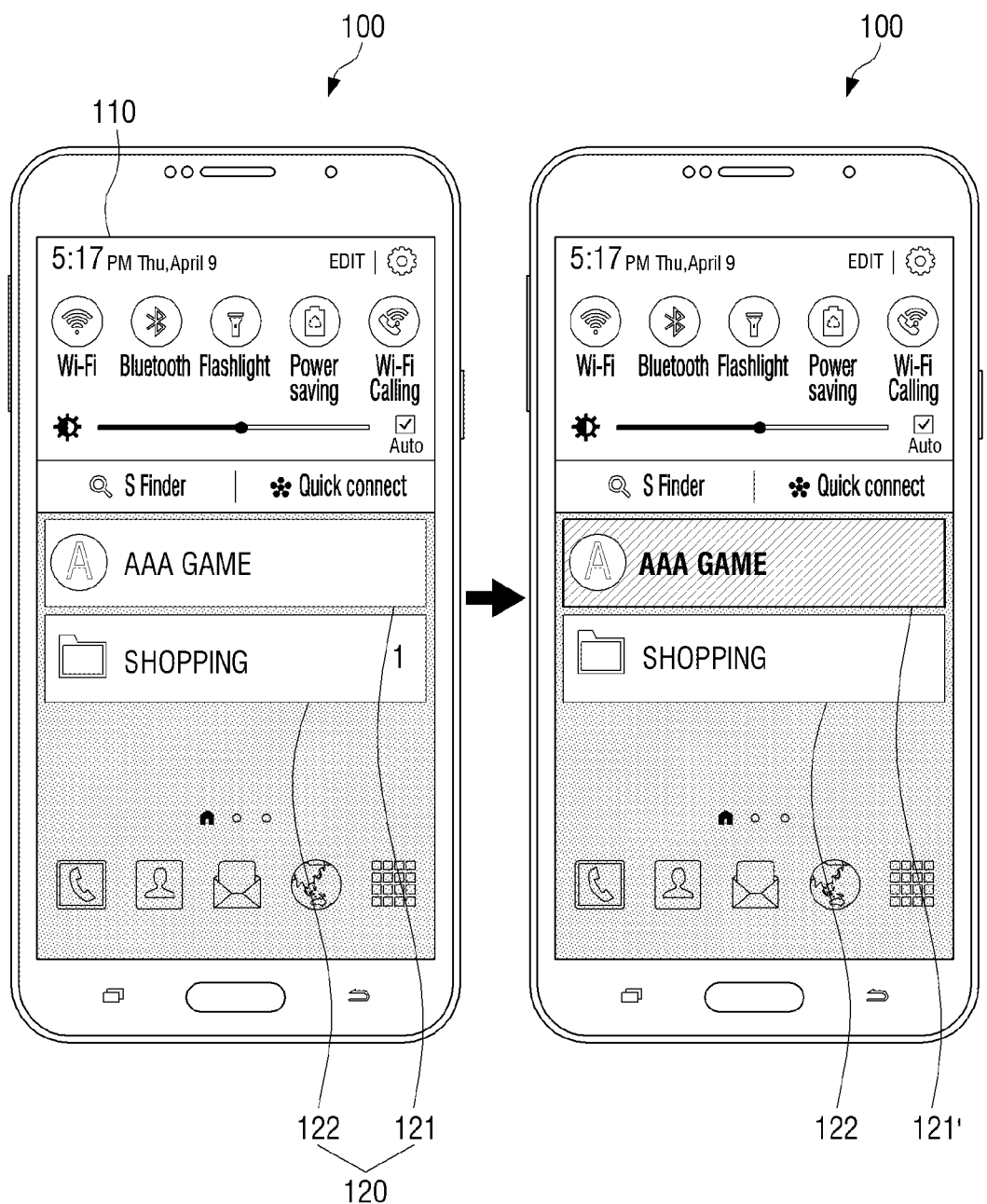
FIGS. 1A and 1B are diagrams illustrating an example operation of an electronic apparatus according to an example embodiment of the present disclosure.

Before describing the example embodiments in detail, the terminology used herein will be briefly explained.

The terms used herein are selected from the general terms that are widely used at present and in consideration of the functions in the present disclosure, but at the same time, the terms may vary depending on the intent of those skilled in the art or the precedents, or by the emergence of new technologies. Further, certain terms may be arbitrarily chosen, in which case the corresponding meaning will be described in detail in the disclosure. Accordingly, the terms used herein will be defined not simply based on the names of the terms, but based on the meanings of the terms and the context throughout the description.

The example embodiments of the present disclosure may have a variety of modifications and several examples. Accordingly, while various example embodiments are described in detail herein, these are not intended to limit the scope of the present disclosure to the particular example embodiments only. Rather, it should be understood that the example embodiments encompass all the modifications, equivalents or replacements that fall under the concept and technology scope as disclosed. In describing the example embodiments, well-known functions or constructions may not be described in detail when they obscure the disclosure with unnecessary detail. Further, the terms described below are those that are defined in consideration of the functions of the present disclosure and may be varied according to users, operators or practices. Accordingly, definitions will have to be made based on the content provided throughout the description.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of characteristic, number, step, operation, element, component, or a combination thereof, and not to preclude a presence or a possibility of adding one or more of other characteristics, numbers, steps, operations, elements, components or a combination thereof.

In the example embodiments of the present disclosure, a 'module' or a 'unit' may perform at least one function or operation, and be implemented as hardware (e.g., circuitry) or software, or as a combination of hardware and software. Further, except for the 'module' or the 'unit' that has to be implemented as particular hardware (e.g., a dedicated processor), a plurality of 'modules' or a plurality of 'units' may be integrated into at least one module and implemented as at least one processor (not illustrated).

In the example embodiments of the present disclosure, when a certain portion is "coupled" with another portion, this means not only the "direct coupling", but also "electrical coupling" and may be accomplished with intervention of another device interposed therebetween. Further, when a certain portion "comprises" a certain element, unless otherwise specified, this means that the certain portion may additionally include another element, rather than precluding another element.

The present disclosure will be described in greater detail below with reference to the accompanying drawings to enable those skilled in the art to work the present disclosure with ease. However, the present disclosure may be implemented as several different forms and not to be limited to any of specific examples described herein. Further, in order to clearly describe the present disclosure in the drawings, portions irrelevant to the description may be omitted, and throughout the description, the like elements are given the similar reference numerals.

Further, in the example embodiments of the present disclosure, a user input may include various input circuitry, such as, for example, and without limitation, at least one of touch input, bending input, voice input, button input, motion input, and multimodal input, but not limited thereto.

Further, in the example embodiments of the present disclosure, a "touch input" may include a touch gesture to a display or a cover in order to control the apparatus. Further, the "touch input" may include a touch (e.g., floating or hovering) not in contact with the display, but at a predetermined distance or longer distance away from the display. The touch input may include a touch and hold gesture, a tap gesture that lifts off after touch, a double tap gesture, a panning gesture, a flick gesture, a touch/drag gesture that moves after touch, a pinch gesture, or the like, although example embodiments are not limited thereto.

In the example embodiments of the present disclosure, a "button input" may refer, for example, to an input with which the user controls the apparatus by using physical buttons attached onto the apparatus.

In the example embodiments of the present disclosure, a "motion input" may refer, for example, to a motion the user performs to the apparatus in order to control the apparatus. For example, the motion input may include a user rotating the apparatus, tilting the apparatus, or moving the apparatus up, down, left and right.

Further, in the example embodiments of the present disclosure, a "multimodal input" may refer, for example, to at least two inputting techniques being combined. For example, the apparatus may receive a touch input and a motion input from the user, or may receive a touch input and a voice input from the user, or the like, but is not limited thereto.

Further, in the example embodiments of the present disclosure, an "application" may refer, for example, to a set of computer programs designed to perform a certain job or task. In the example embodiments, various applications may be used. For example, game applications, video playback applications, map applications, memo applications, calendar applications, phonebook applications, broadcast applications, exercise support applications, settlement applications, photo folder applications, medical device control applications, or user interface providing applications of a plurality of medical equipment, or the like, but not limited thereto.

Further, in the example embodiments, "application identification information" may refer, for example, to unique information to distinguish an application from other applications. For example, the identification information for the application may include one or more of an icon, an index item, link information, and so on, although not limited thereto.

Further, in the example embodiments of the present disclosure, a user interaction or interface (UI) element may refer, for example, to an element that is capable of interacting with a user to thus provide visual, auditory, or olfactory feedbacks in response to a user input.

Hereinbelow, various example embodiments of the present disclosure will be described in greater detail with reference to the accompanying drawings.

FIGS. 1A and 1B are diagrams illustrating an example operation of an electronic apparatus according to an example embodiment of the present disclosure. For example, FIGS. 1A and 1B illustrate an example circumstance in which a notification display option for an application to generate notification information 120 is being changed on the electronic apparatus 100.

Referring to FIG. 1, the electronic apparatus 100 may be implemented as a multi-purpose device equipped with a display 110. For example, the electronic apparatus 100 may be implemented as mobile phone, smart phone, laptop computer, tablet device, e-book device, digital broadcast device, personal digital assistants (PDA), portable multimedia player (PMP), navigation, or wearable device such as smart watch, smart glasses, head-mounted display, or the like, but is not limited thereto.

Referring to FIG. 1A, the electronic apparatus 100 may display notification information 120 on the display 110. The notification information 120 may refer to a UI used by an application or the electronic apparatus 100 to display a notification on the display 110 to indicate current status, or the like.

The notification information 120 may otherwise be called various names such as "notification UI," "quick panel," or the like, although it is described as the notification information 120 herein.

The notification information 120 may be displayed on the display 110 in a popup form, or may be in such a form that is scrolled on one side (e.g., upper side) of the display 110 to cover the original screen of the display 110. A plurality of notification information 120 may be displayed at the same time.

The electronic apparatus 100 may display the notification information 120 upon occurrence of a preset event. For example, the electronic apparatus 100 may display the notification information 120 upon occurrence of: an event in which the electronic apparatus 100 is turned on and completed booting; an event in which the user drags from one side (e.g., upper side) of the screen in a downward direction; an event in which the user selects a certain button or menu; an event in which at least a certain number of notifications is generated; and an event in which a preset time period approaches. The types of events are described only for illustrative purposes, and notifications may be displayed about a variety of events without limitation.

The user may select respective items 121, 122 in the notification information 120 to enter an application associated with the selected items, or simply check the content included in the corresponding items.

For example, the notification information 120 may be accumulated and displayed according to the time at which the notifications are generated. For example, the most recently-generated notification information may be displayed on the top. FIG. 1A illustrates an example in which two notification information 121, 122 are displayed. Referring to FIG. 1A, the first notification information 121 is the notification information generated later than the second notification information 122, and thus may be located above the second notification information 122. However, example embodiments are not limited to such arrangement.

In the present disclosure, a variety of user interactions for selecting respective notification information may be used to confer user preferences to the application associated with the notification information, or the attributes of the content included in the notification information.

The "user interaction" may collectively refer, for example, to a variety of operations input by the user with respect to the electronic apparatus. For example, touch, touch and drag, flick, double touch, long touch, stare, voice input, button manipulation, or the like, may all be referred to as the user interaction. Additionally, a behavior of non-use for a predetermined time period or longer may also be referred to as a type of user interaction.

FIG. 1B illustrates a notification of an application conferred with preference. The electronic apparatus 100 may change options for indicating a notification of an application that generates the notification information 120 displayed on the display 110 based on the user preference.

For example, it is assumed herein that the first notification information 121 is the notification information for a game named 'AAA', the second notification information 122 is the notification information associated with shopping, and the user has used the game 'AAA' for a predetermined number of times or more, or checked the notification information for the game 'AAA' for a predetermined number of times or more.

The electronic apparatus may change the display options for the notification information 120 such that the first notification information 121 regarding the game 'AAA' can be displayed with more distinctiveness than other notification information.

FIG. 1B illustrates an example in which an option for text width is changed. According to FIG. 1B, the electronic apparatus 100 may display the notification information 120 on the display 110 when an event that necessitates display of the notification information 120 occurs. A plurality of notification information 120 may be displayed simultaneously. Compared to FIG. 1A, the texts in the notification information 121' of the game 'AAA' are displayed with greater width (e.g., bold) in FIG. 1B. This is a result of increased preference for the game application 'AAA' by the user who performed the same operation of selecting the notification information 121 of the game 'AAA' for a predetermined number of times or more.

There may be a variety of display options for displaying the notification information 120 generated from the application of increased preference or the notification information 120 including the content of increased preference, differently from the other notification information 120.

The display options may be the options associated with change of forms of notification information, display of additional notification information, grouping of a plurality of notification information, change of content of displayed notification information, or the like.

The options associated with the change of forms of the notification information may involve displaying the texts of the notification information 120 in greater width, as described above. In addition, the options may include changing overall color of the notification information 120, changing order of displaying, or changing sizes, brightness, chroma, or fonts, or the like. An option of adding highlighting or other graphic effects to a corresponding notification window may be included.

The options associated with additional notification information may be an option of inquiring as to whether or not to generate notification information for an application which generated notification information that has continuously been left unchecked.

The options associated with grouping of a plurality of notification information may be an option of grouping a plurality of notification information and displaying these as one piece of notification information, instead of individually displaying the notification information generated from the applications with lower preferences.

The options regarding change of displayed content of the notification information may refer to an option of showing at least part of the content included in the notification information in advance on the notification window, for the notification information generated from the applications with higher preferences. Various options including those described above will be described below.

As described above, the electronic apparatus 100 may, for example, differently express the forms of notification information 120 by reflecting user preferences, to enable the user to see the notification for the usually-preferred application or content first.

Figure 2:
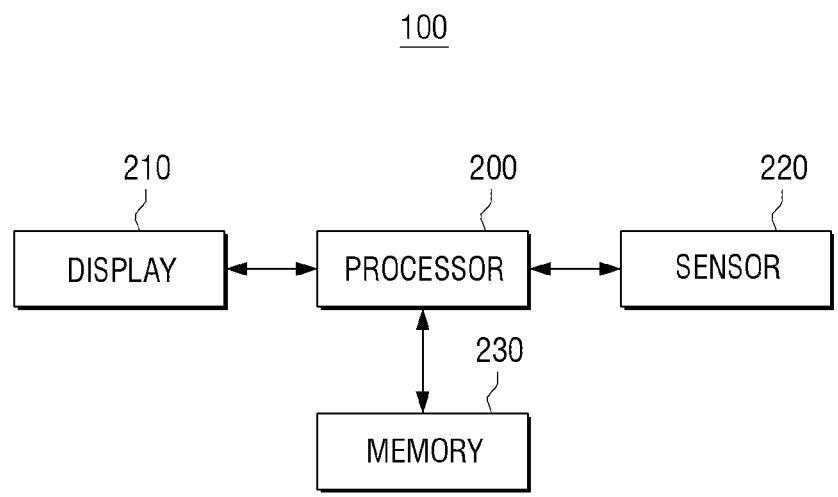
FIG. 2 is a block diagram illustrating an example configuration of an electronic apparatus according to an example embodiment of the present disclosure.

FIG. 2 is a block diagram illustrating an example configuration of an electronic apparatus according to an example embodiment of the present disclosure.

Referring to FIG. 2, the electronic apparatus 100 may include a processor (e.g., including processing circuitry) 200, a display 210, a sensor 220, and a memory 230.

The display 210 may display texts, images, icons, and so on. The display 210 may be divided into a plurality of regions, with each of the regions displaying different objects. For example, one region may display icons to perform preset functions, and the other regions may display texts or images. Further, the display 210 may display on a certain region a notification indicating status of the apparatus, or a notification transmitted from an external apparatus such as a server. The notifications, texts, images or icons displayed on the display 210 may be displayed by a manufacturer of the electronic apparatus 100, a provider of the applications installed on the electronic apparatus 100, a provider of the operating system, or the like.

The sensor 220 may refer, for example, to an element to sense touch. The sensor 220 may sense a touch of a user with a touch sensor. The sensor 220 may process the electric signals received from respective electrodes and then send a resultant value to the processor 200. The processor 200 may include various processing circuitry and may determine the intensity of the touch or the length of the touch, or movement of the touch, or the like, using, for example, a resultant value of the intensity. The sensor 220 may be implemented by various sensor circuitry, such as, for example, and without limitation, a touch pad which may be provided separately from the display 210, or the sensor 220 may be implemented as a touch screen integrated with the display 210.

The processor 200 may include various processing circuitry configured to control the operation of the electronic apparatus 100. The processor 200 may display the notification transmitted from the external server on one region of the display 210. Further, the processor 200 may distinguish user's various interactions to the notifications displayed on one region of the display 210.

For example, the user may select the notification by touching it, and dragging it to a predetermined direction and deleting it. The sensor 220 may sense the operation of the user as that described above, and transmit it to the processor 200. The processor 200 may distinguish the operations described above and perform functions previously set for each of the operations.

The memory 230 may store instructions for the processor 200 to perform the operations described above. For example, when the sensor 220 senses the touch operation of the user and transmits it to the processor 200, based on a type of notification item displayed at a location from which the touch operation is sensed and in response to the touch operation as stored in the memory 230, the processor 200 may read out the function of checking the content of the notification and perform the same.

As described above, the notification information may be displayed when a preset event occurs.

Figure 3A:
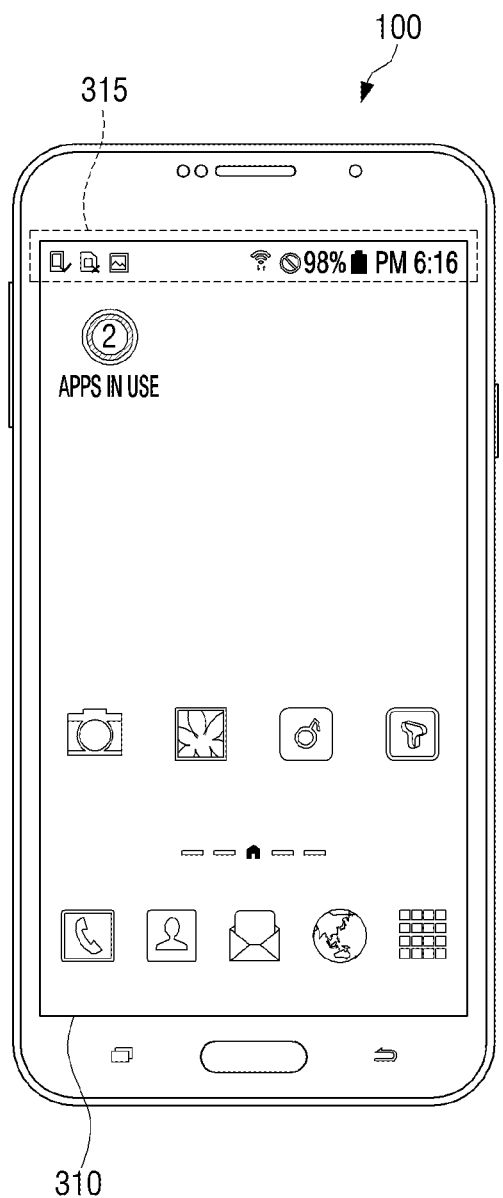
FIGS. 3A and 3B are diagrams illustrating an example electronic apparatus displaying a notification window and a notification according to an example embodiment of the present disclosure.
Figure 3B:
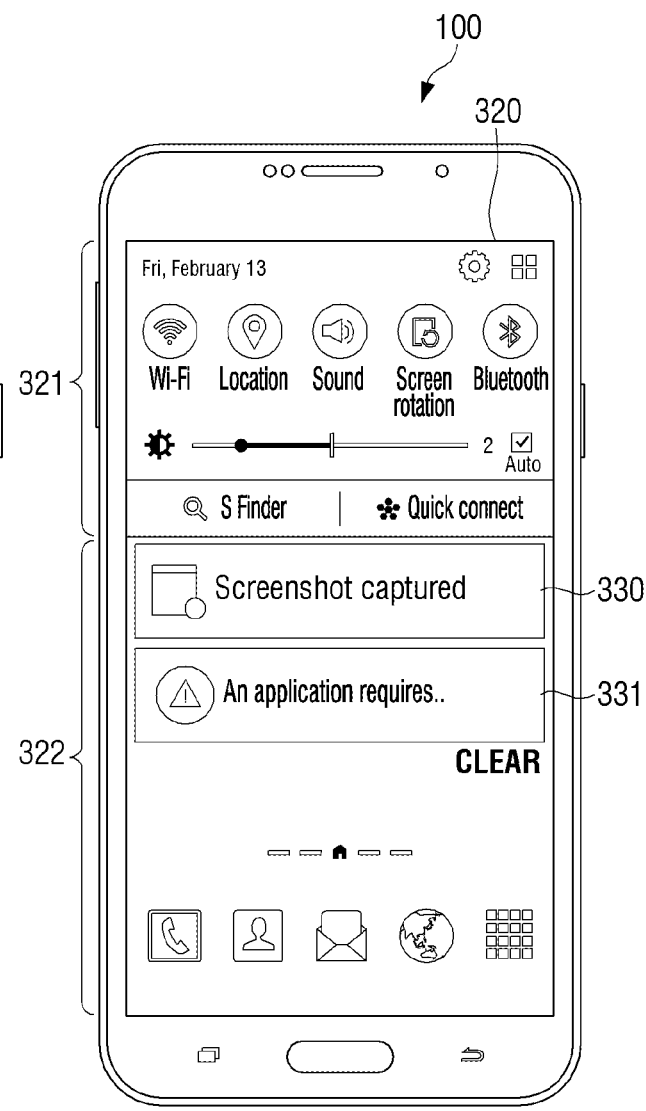

FIGS. 3A and 3B are diagrams illustrating an example electronic apparatus displaying notification window and notification information according to an example embodiment of the present disclosure.

Hereinbelow, the notification window 320 and the notification information 330 will be briefly described.

FIG. 3A illustrates a home screen 310 of the electronic apparatus 100. In the home screen 310, icons representing a variety of applications may be displayed. On the upper end of the screen, a status indication bar 315 may be displayed. The status indication bar 315 may display communication status, battery charge, time, and so on of the electronic apparatus 100.

FIG. 3B illustrates the electronic apparatus 100 displaying the notification window 320. The notification window 320 may appear when the user drags the status indication bar 315 to a direction below the electronic apparatus 100. However, example embodiments are not limited thereto.

Referring to FIG. 3B, the notification window 320 may display a variety of information. The notification window 320 may be divided into a plurality of regions. The first region 321 may display icons to display the current status of the electronic apparatus 100 and change the same. For example, the user may select a wireless fidelity (wifi) icon to activate or block wifi. The user may select a location icon to activate or block global positioning system (GPS) function of the electronic apparatus 100.

The second region 322 may display notification information generated from an application installed on the electronic apparatus 100, or notification information transmitted from the external server. The notification information 330, 331 may display the notifications generated from various sources. The sources may include a variety of sources such as external server, applications installed on electronic apparatus, operating system (OS) of the electronic apparatus, or the like. For example, the notification information 330, 331 may display text message composed on another electronic apparatus. The notification information 330, 331 may display part of the text message, or display only the author who composed the text message. When text messages generated from several types of text message applications are received, the notification information 330, 331 may display one notification information 330, 331 for each type. When the user selects one notification information 330, 331, the content of the text message may be checked, or the associated text message application may be activated.

The notification information 330, 331 may be generated from an application installed on the electronic apparatus 100, or an application manager may display the notification transmitted via external server. When notifications generated from several types of applications are received, the notification information 330, 331 may display notification information 330, 331 for each application. When the user selects one notification information 330, 331, the content of the notification may be checked, or the associated application may be activated.

Hereinbelow, when the notification information is displayed as described above, an example in which the electronic apparatus 100 determines preferences based on a variety of user's behaviors to the notification information will be described in detail below.

Figure 4A:
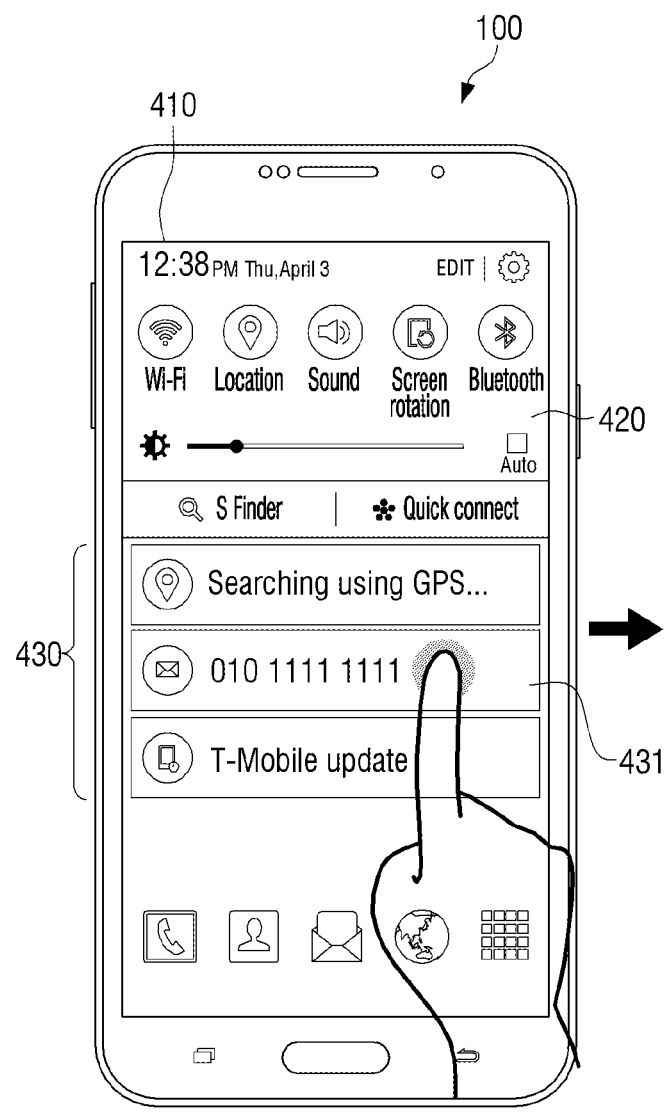
FIGS. 4A and 4B are diagrams illustrating an example circumstance in which a user selects a notification from an electronic apparatus according to an example embodiment of the present disclosure.
Figure 4B:
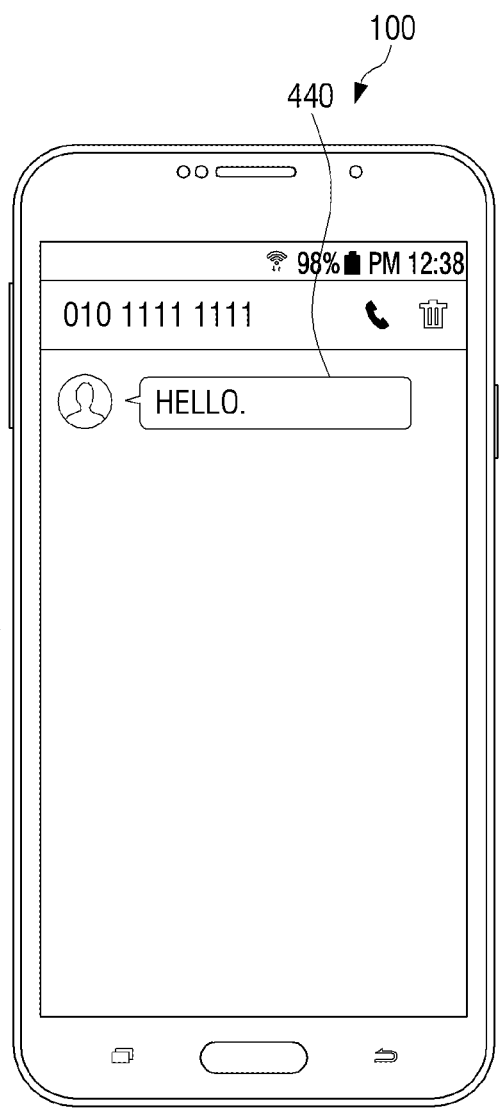

FIGS. 4A and 4B are diagrams illustrating an example circumstance in which the user selects notification information on an electronic apparatus according to an example embodiment of the present disclosure.

Referring to FIG. 4A, the electronic apparatus 100 may display a notification window 420 on the display 410. The notification window 420 may display a plurality of notification information. The user may select the notification information 430 that he or she wants to check among a plurality of notification information 430. The user may select the notification information 430 by touching it. However, example embodiments are not limited to the specific example provided above. Accordingly, the user may, for example, select the notification information 430 using another physical key. When the user selects the notification information 430, the electronic apparatus 100 may execute a corresponding application to display the notification information.

FIG. 4B illustrates the electronic apparatus 100 activating a corresponding application in response to the user's selecting of the notification information 430. For example, by the user selecting the text message notification information 431, the electronic apparatus 100 may activate the text message application 400.

Referring to FIG. 4B, the electronic apparatus 100 may display contact information of a counterpart who sent the text message, and display the entire content of the text message sent from the counterpart.

The user may touch to select the notification information 430 with an intention to check the content included in the notification information 430. Accordingly, the electronic apparatus 100 may perceive the user's behavior as described above to be the behavior to increase the preference to the corresponding application.

When the user touches the notification information 430 and selects the same within a predetermined time after the notification information 430 is generated, the electronic apparatus 100 may perceive this as a behavior of increasing preference to the corresponding application. On the other hand, when the user leaves the notification information 430 as is without touching the same 430 for longer than a predetermined time after the notification information 430 is generated, the electronic apparatus 100 may perceive this as a behavior of decreasing preference to the corresponding application. The preference data may be stored in the memory 230, to be retrieved by the processor 200 and used as necessary.

The user interaction may be divided into various types based on the meanings thereof. The processor may adjust the preferences to the notification information or the applications providing the notification information, based on a type of the user interaction. For example, the user interaction to check the notification information, or to execute the application may be classified as a positive interaction ('first type'), and the interaction to delete notification information or to move it to lower rank, or the interaction of not checking the notification information for a predetermined time may be classified as a negative interaction ('second type').

While a plurality of notification information is being displayed, when the first type user interaction is generated selectively for at least one notification information, the processor 200 increases the preference for the application that provides the selected notification information. On the other hand, when the second type user interaction is generated, the processor may decrease the preference for the application that provides the selected notification information. The processor 200 may display the notification information of the application having higher application at a location or rank for better notice of the user, or display the same with distinctiveness.

For example, the first type user interaction may include a first interaction of selecting one of notification information, and a second interaction of dragging one of the notification information in a first direction. The second type user interaction may include a third interaction of dragging one of the notification information in a second direction, and a fourth interaction of selecting a delete menu to delete the notification information.

Figure 5A:
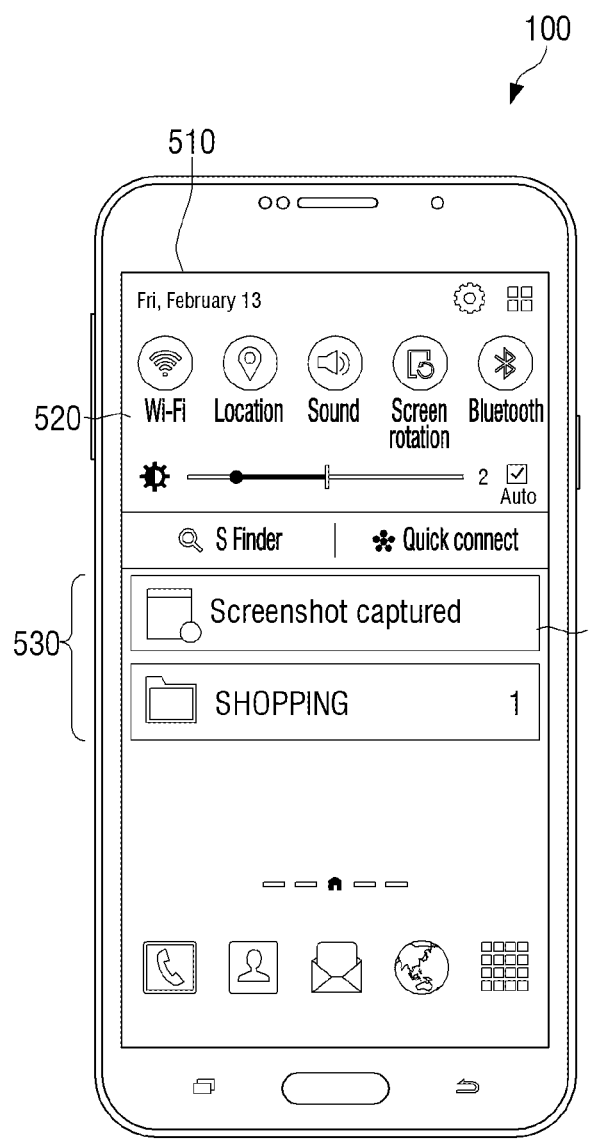
FIGS. 5A and 5B are diagrams illustrating an example of a user selecting a notification from an electronic apparatus according to another example embodiment of the present disclosure.
Figure 5B:
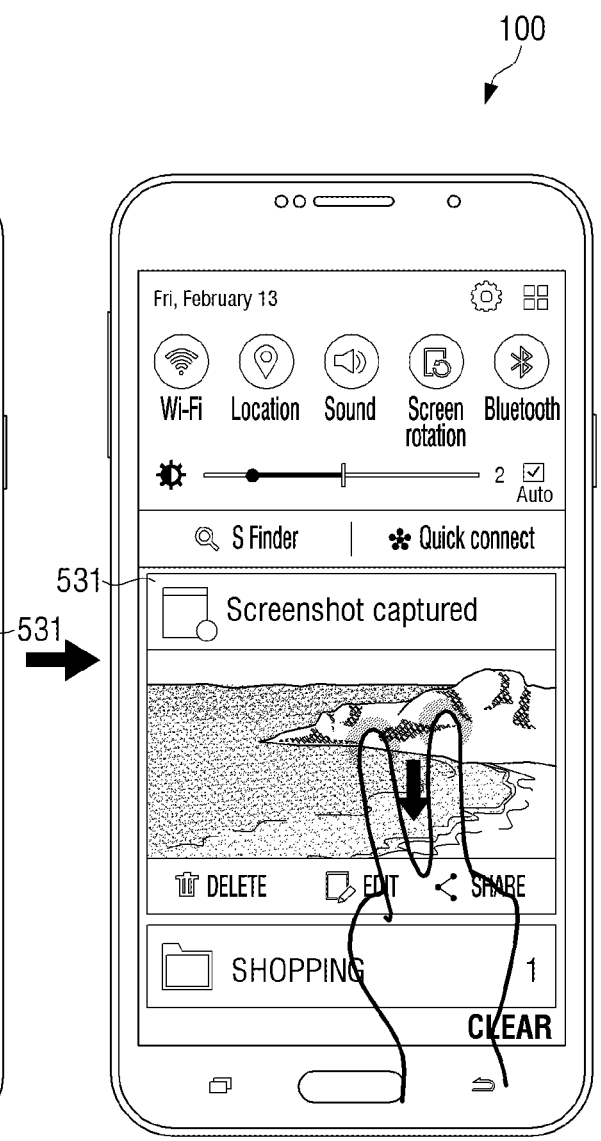

FIGS. 5A and 5B are diagrams illustrating an example of a user selecting notification information from an electronic apparatus according to another example embodiment of the present disclosure.

Referring to FIG. 5A, the electronic apparatus 100 may display a notification window 520 on the display 510. The notification window 520 may display a plurality of notification information 530. The user may select the notification information 530 he or she wants to check among a plurality of notification information 530. The user may drag the notification information 530 in a first direction. The first direction may be a direction of dragging the notification information 531 to a direction below the electronic apparatus 100, for example.

When the user drags the notification information 531, the electronic apparatus 100 may display the corresponding content of the notification as a preview.

FIG. 5B illustrates the electronic apparatus 100 displaying the content included in the notification information 531 on a screen without activating an application, in response to the user's dragging the notification information 531.

For example, the user may drag the screen shot notification information 531. The screen shot notification information 531 may be notification information that notifies of completion of capture when the user captures the screen displayed on the display 510 as is. When the user drags the screen shot notification information 531, the electronic apparatus 100 may display the captured image on the notification window 521 as displaying a preview, without activating a gallery application.

FIG. 5B illustrates the user performing an operation of dragging the notification information 531 with his or her two fingers, but example embodiments are not limited thereto. For example, according to various example embodiments, the user may touch on the notification information 531 for a long time with his or her one finger, or touch the notification information 531 with one finger two times within short time, etc.

The process that the user drags the notification displayed on the notification information 530 to preview the same may represent the user's intention that he or she wants to check the content included in the notification information 530. The electronic apparatus 100 may perceive the user's behavior described above to be the behavior of increasing preference for the corresponding application, for example, the electronic apparatus 100 may perceive the user's above behavior to be the first type interaction.

Once the notification information 530 is generated, when the user drags the notification information 530 to preview it within a predetermined time, the electronic apparatus 100 may perceive this to be the behavior of increasing the preference for the corresponding application. On the other hand, when the user leaves the notification information 530 without dragging it for more than the predetermined time after the notification information 530 is generated, the electronic apparatus 100 may perceive this to be the second type interaction, e.g., the behavior of decreasing the preference for the corresponding application. The preference data may be stored at the memory 230, or the like and retrieved by the processor 200 and used as necessary.

Figure 6:
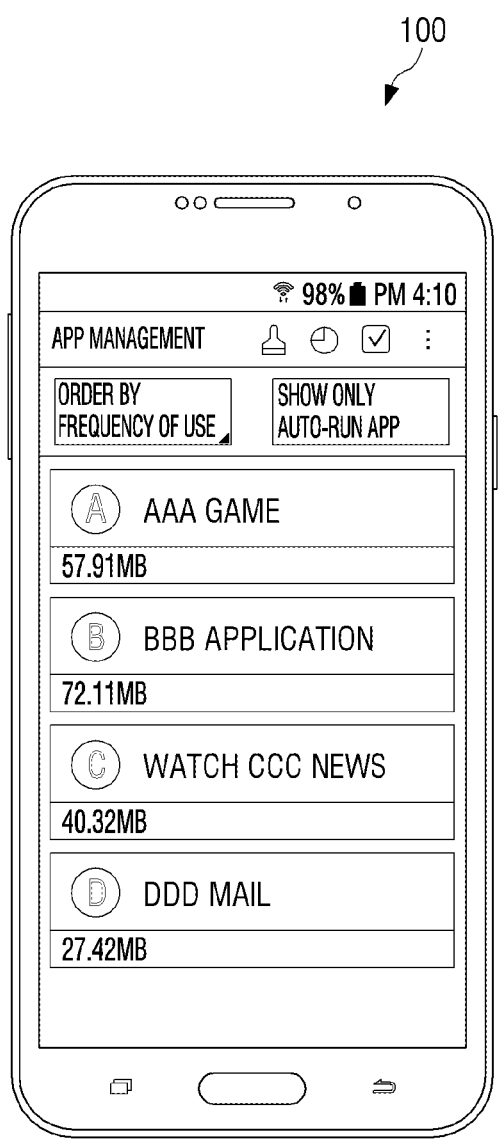
FIG. 6 is a diagram illustrating an example application of an electronic apparatus frequently used by a user according to an example embodiment of the present disclosure.

FIG. 6 is a diagram illustrating an example of an applications highly frequently used by the user on the electronic apparatus according to an example embodiment of the present disclosure.

The applications highly frequently used by the user may be the applications that the user frequently checks and executes. Accordingly, the electronic apparatus may perceive the application with high frequency of use to have high user preference. On the other hand, the application with low frequency of use may be perceived to have low user preference.

The electronic apparatus 100 may take into consideration the user's frequency of using the applications for a preset duration of time, and thus increase the preference for the application with high frequency of user, or decrease the application with low frequency of use. Further, as described above, while the electronic apparatus 100 is displaying the notification information generated by the application, the electronic apparatus 100 may display the notification information of the application with high frequency of use differently from the other notification information. Further, the electronic apparatus 100 may also display the notification information of the application with low preference differently from the other notification information. The preference data may be stored in the memory 230, and retrieved by the processor 200 and used as necessary.

FIGS. 7A and 7B are diagrams illustrating an example of a user deleting notification information on the electronic apparatus according to an example embodiment of the present disclosure.

Referring to FIG. 7A, the electronic apparatus 100 may display a notification window 720 on a display 710. The notification window 720 may display a plurality of notification information 730. The user may delete the notification information 730 that he or she does not want to check among a plurality of notification information 730. The user may drag the notification information 730 in a second direction. For example, the second direction may be leftward or rightward direction of the electronic apparatus 100. When the user drags the notification information 732, the electronic apparatus 100 may delete the notification information displayed on the display 710.

FIG. 7B illustrates the electronic apparatus 100 deleting the notification information 732 in response to the user's dragging the notification information 732.

For example, the user may drag the advertisement notification information 732. The advertisement notification information 732 may be the notification sent to unspecified individuals without having prior permission of the individuals. When the user rags the advertisement notification information 732 in the leftward or rightward direction, the electronic apparatus 100 may delete the advertisement notification information 732 from the notification window 720.

The process that the user drags to delete the notification information 730 without checking the content of the notification displayed on the notification information 730 may represent the user's intention that he or she does not want to check the content included in the notification information 730. Accordingly, the electronic apparatus 100 may perceive the user's behavior described above to be the behavior of decreasing the preference for the corresponding application. The preference data may be stored in the memory 230, and retrieved by the processor 200 and used as necessary.

Figure 8A:
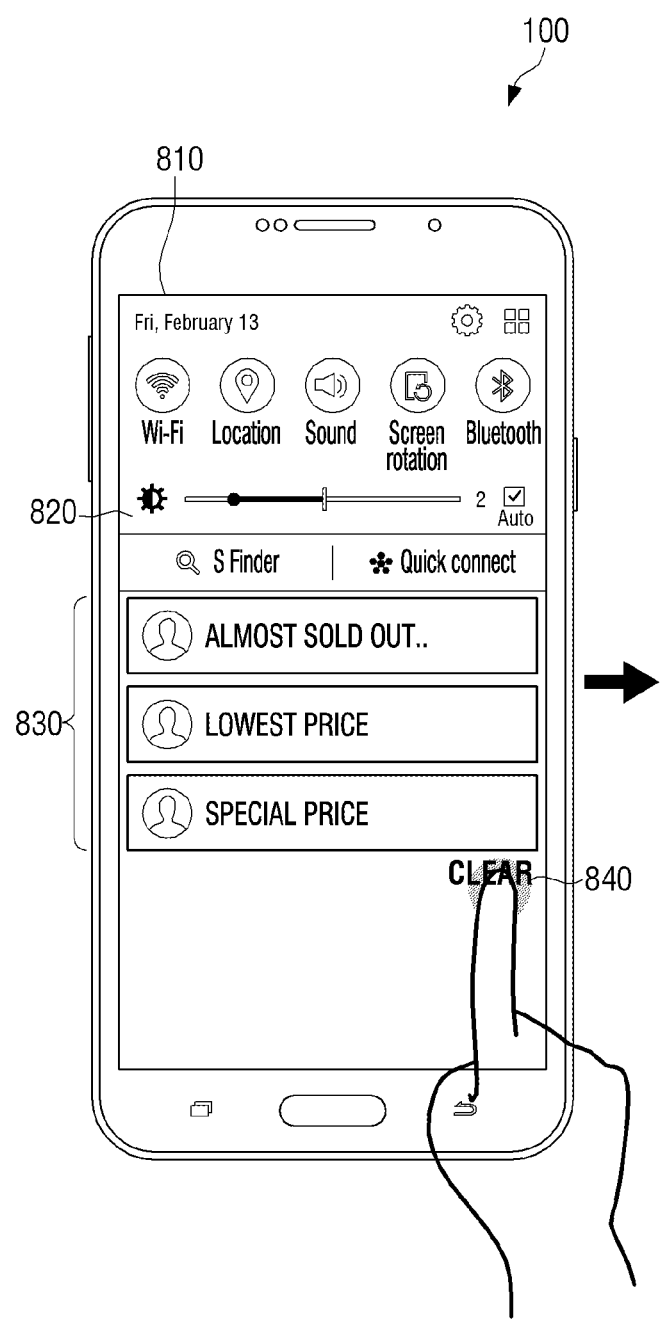
FIGS. 8A and 8B are diagrams illustrating an example of a user deleting a notification from an electronic apparatus according to another example embodiment of the present disclosure.
Figure 8B:
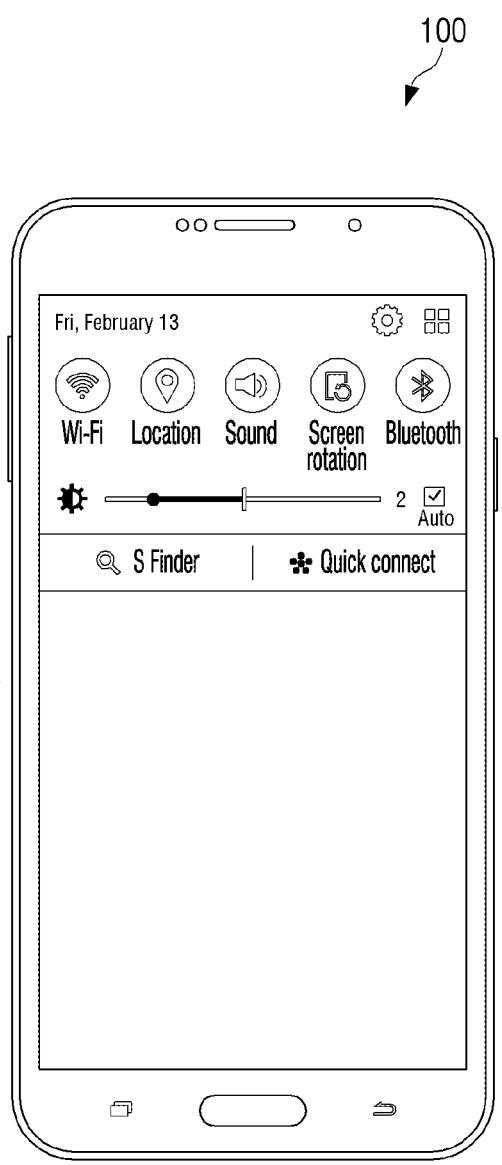

FIGS. 8A and 8B are diagrams illustrating an example of a user deleting notification information on the electronic apparatus according to another example embodiment of the present disclosure.

Referring to FIG. 8A, the electronic apparatus 100 may display a notification window 820 on a display 810. The notification window 820 may display a plurality of notification information 830. The user may delete the notification information 830 that he or she does not want to check among a plurality of notification information 830. The user may select a delete (e.g., "clear") icon 840 for the notification information 830 to delete all the notification information 830 displayed on the notification window 820 at once.

FIG. 8B illustrates the electronic apparatus 100 deleting entire notification information 830 displayed on the notification window 820 in response to the user's selecting the notification information 830 delete icon 840.

For example, the user may collectively delete the advertisement notification information 830. The advertisement notification information 830 may be notifications that are sent to unspecified individuals without having prior permission from the individuals. When the user selects the notification information 830 delete icon 840, the electronic apparatus 100 may collectively delete the entire notification information 830 displayed on the notification window 820.

The process that the user collectively deletes the notification information 830 without checking the content of the notification displayed on the notification information 830 may represent the user's intention that he or she does not want to check the content included in the notification information 830. Accordingly, the electronic apparatus 100 may perceive the user's behavior described above to be the behavior of decreasing preference for the corresponding application. The preference data may be stored in the memory 230, and retrieved by the processor 200 and used as necessary.

Hereinbelow, example embodiments will be described in greater detail with reference to an example in which the electronic apparatus 100 distinguishes user interactions to the notification information, and increases or decreases the preference for the application associated with the notification information or the content included in the notification information.

Figure 9A:
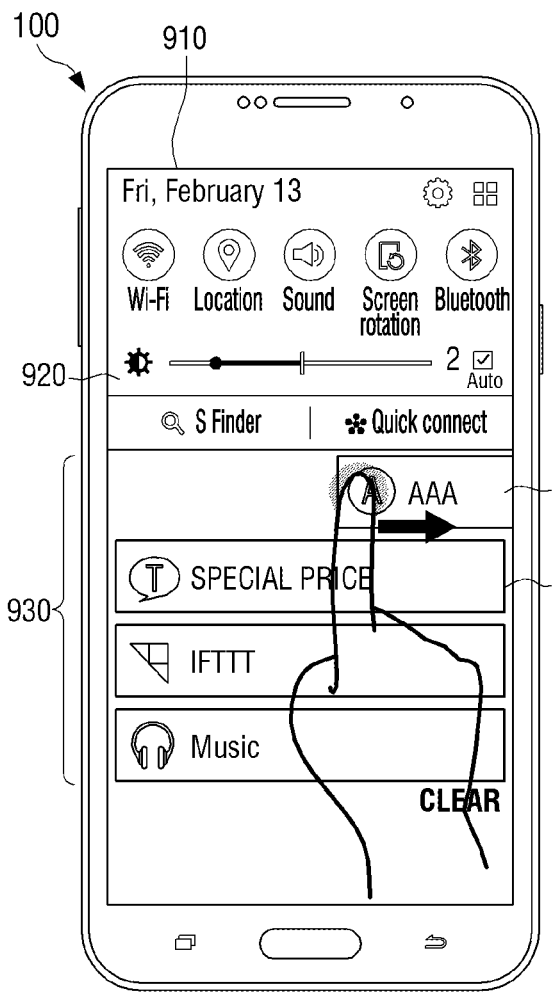
FIGS. 9A, 9B and 9C are diagrams illustrating an example electronic apparatus adjusting a preference of an application based on an operation of a user to a notification, according to an example embodiment of the present disclosure.
Figure 9B:
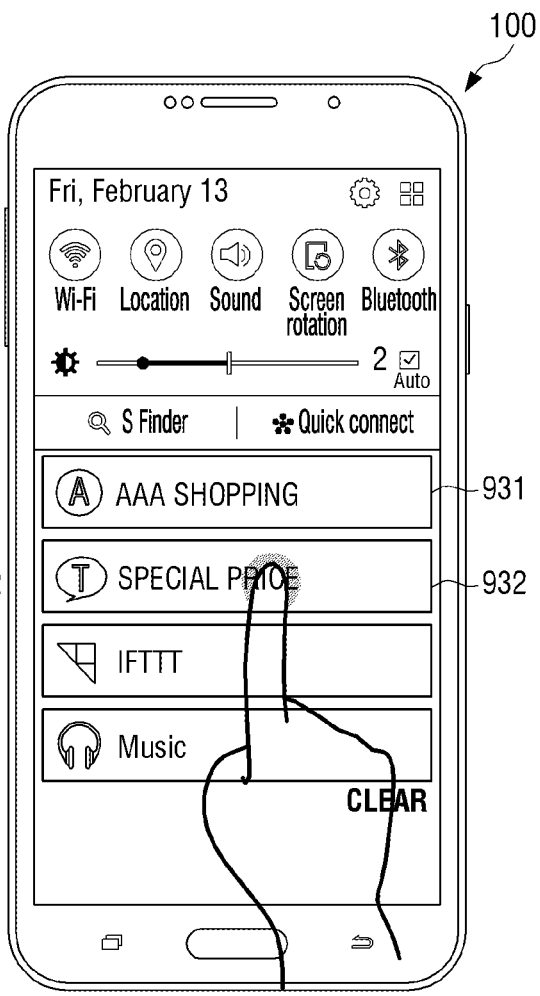
Figure 9C:
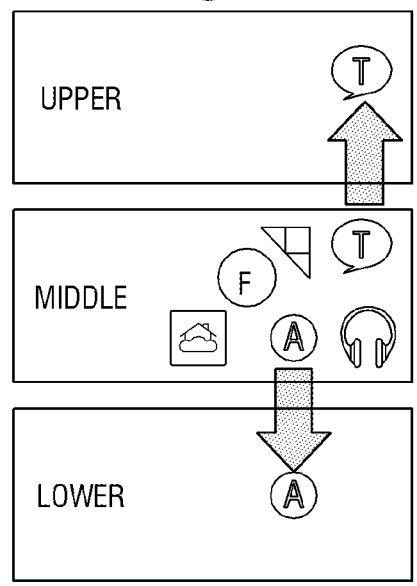

FIGS. 9A, 9B and 9C are diagrams illustrating an example of the electronic apparatus adjusting preference for an application based on the user operation toward the notification information, according to an example embodiment of the present disclosure.

Referring to FIGS. 9A and 9B, the electronic apparatus 100 may display a notification window 920 on a display 910. The notification window 920 may display a plurality of notification information 930 including, for example, information 931 and 932. The user may select the notification information 930 that he or she wants to check the content, and delete the notification information 930 that he or she does not want to check the content. The operation of the user touching and selecting the notification information 930, and the operation of dragging and deleting the notification information 930 will not be repeated below for the sake of brevity.

The electronic apparatus 100 may divide the user's operation toward the notification information 930 into two types and store these. For example, when the user selects the notification information 930 and checks the content, such operation may be the operation of increasing the preference to the associated application or the content included in the notification information 930. The operation of the user deleting the notification information 930 without checking the content thereof may be the operation of decreasing the preference for the associated application or the content included in the notification information 930.

The electronic apparatus 100 may increase the preference for the corresponding application, when the operation of increasing the preference for the notification information 930 of such application is repeated for at least a threshold number of times. The electronic apparatus 100 may decrease the preference for the corresponding application, when the operation of decreasing the preference for the notification information 930 of such application is repeated for at least a threshold number of times.

For example, referring to FIG. 9C, the user selects the TTT talk notification information 932 as illustrated in FIG. 9B, in which case the preference for the TTT talk application is increased. When the user's operation described above is repeated for at least a threshold number of times, the TTT talk application may have the preference changed to "high" preference.

Referring to FIG. 9C, when the user drags to delete the AAA shopping notification information 931 as illustrated in FIG. 9A, the AAA shopping application has a deceased preference. When the user's operation described above is repeated for at least a threshold number of times, the AAA shopping application may have the preference changed to "low" preference. The preference data may be stored in the memory 230, and retrieved by the processor 200 and used as necessary.

Figure 10A:
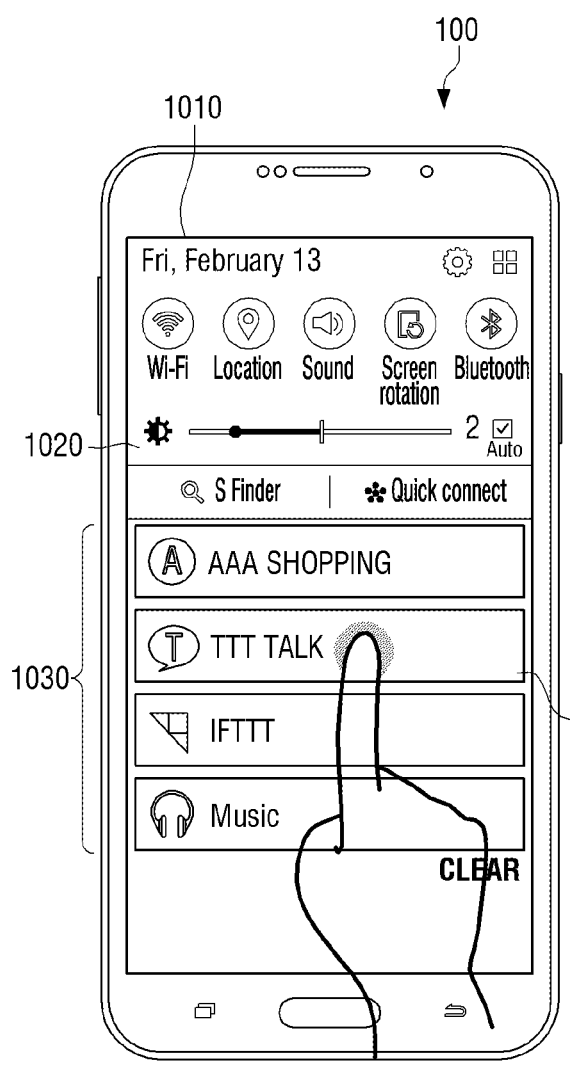
FIGS. 10A and 10B are diagrams illustrating an example electronic apparatus adjusting a preference of an application based on an operation of a user to a notification, according to another example embodiment of the present disclosure.
Figure 10B:
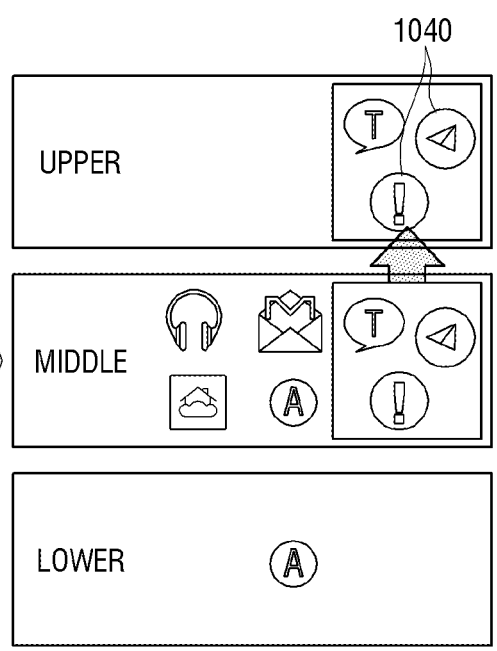

FIGS. 10A and 10B are diagrams illustrating an example of an electronic apparatus adjusting the preference for the application based on the user interaction toward the notification information, according to an example embodiment of the present disclosure.

Referring to FIG. 10A, the electronic apparatus 100 may display a notification window 1020 on a display 1010. The notification window 1020 may display a plurality of notification information 1030 including, for example, 1032. The user may select the notification information 1030 that he or she wants to check the content among a plurality of notification information 1030, and delete the notification information 1030 that he or she does not want to check the content. The operation of the user touching to select the notification information 1030, and the operation of dragging to delete the notification information 1030 will not be repeated below, but referenced to the description provided above.

As described, the electronic apparatus 100 may increase the preference for the corresponding application, when the operation of increasing the preference to the notification information 1030 of such application is repeated for at least a threshold number of times, or decrease the preference to the corresponding application, when the operation of decreasing the preference for the notification information 1030 of the application is repeated for a threshold number of times of more.

Referring to FIG. 10B, the user selects to check the content of the TTT talk notification information 1032, in which case the TTT talk application has the increased preference. When the user's operation described above is repeated for at least a threshold number of times, the TTT talk application may be changed to the application with the "high" preference.

The electronic apparatus 100 may also adjust the preference for another application having similar characteristics to the application with changed preference by adjusting threshold.

Referring to FIG. 10B, the messenger applications 1040 other than the TTT talk application may have preferences also changed to "high" preferences. Because the user shows high preference for the messenger application, the electronic apparatus 100 may increase the preference for the other messenger applications too, based on the determination that the user would also have high preference for the other messenger applications. However, example embodiments are not limited to specific examples only. The preference data may be stored in the memory 230, and retrieved by the processor 200 and used as necessary.

Figures 11A, 11B:
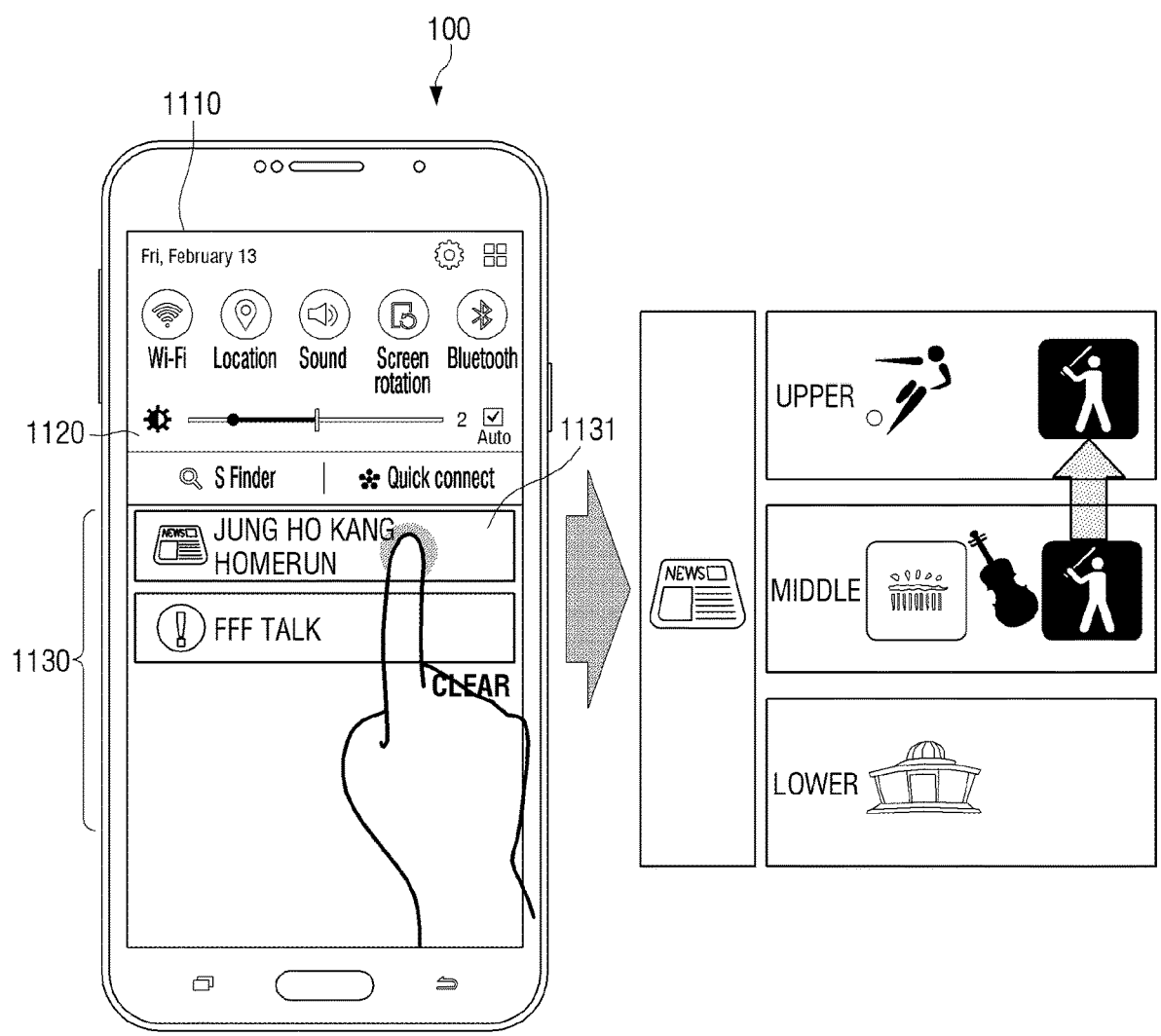
FIGS. 11A and 11B are diagrams illustrating an example electronic apparatus adjusting a preference according to a type of contents included in a notification, according to an example embodiment of the present disclosure.

FIGS. 11A and 11B are diagrams illustrating an example of an electronic apparatus adjusting preference based on types of contents included in the notification information, according to an example embodiment of the present disclosure.

The electronic apparatus 100 may display a notification window 1120 on a display 1110. The notification window 1120 may display a plurality of notification information 1130 including, for example, notification information 1131. The electronic apparatus 100 may display the notification information 1131 generated from a news application.

The news application may transmit to the electronic apparatus 100 various types of news in a form of notification information 1131. For example, the news notification information 1131 may include contents from a variety of fields including sports, politics, culture, economics, etc.

Referring to FIG. 11A, the user may select the news notification information 1131. For example, the news notification information 1131 selected by the user includes the sports-related contents such as baseball-related contents. Because the user selects to check the content of the baseball news notification information 1131, the baseball news has increased preference. When the operation of the user described above is repeated for at least a threshold number of times, the baseball news may be changed to the content having "high" preference as illustrated in FIG. 11B. The preference data may be stored in the memory 230, and retrieved by the processor 200 and used as necessary.

Figure 12A:
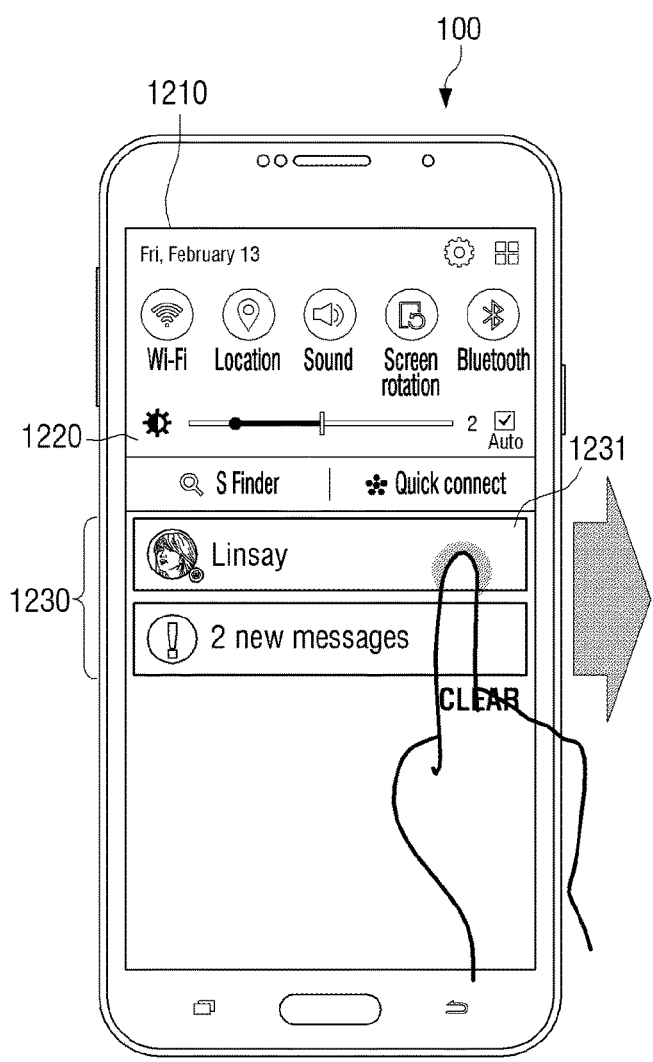
FIGS. 12A and 12B are diagrams illustrating an example electronic apparatus adjusting a preference according to a type of contents included in a notification, according to another example embodiment of the present disclosure.
Figure 12B:
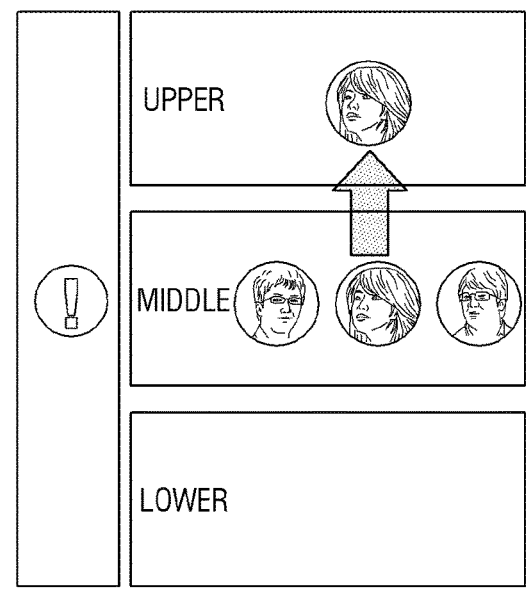

FIGS. 12A and 12B are diagrams illustrating an example of an electronic apparatus adjusting preference based on types of contents included in the notification information, according to another example embodiment of the present disclosure.

The electronic apparatus 100 may display a notification window 1220 on a display 1210. The notification window 1220 may display a plurality of notification information 1230 including, for example, notification information 1231. The electronic apparatus 100 may display notification information 1230 generated at a messenger application.

The messenger application may transmit messages by various users in a form of notification information 1230 to the electronic apparatus 100.

Referring to FIG. 12A, the user may select the notification information 1231 to a specific person. The specific person selected by the user may be someone that the user considers important. The user may instantly respond to a message from the selected specific person. Accordingly, the preference for the specific person may be increased among a variety of people included in the messenger as illustrated in FIG. 12B. When the operation of the user described above is repeated for at least a threshold number of times, the preference for the specific person may change to "high."

As described above, the processor 200 may not only adjust the reference for each of the applications based on user interactions, but also adjust the preference for each of the contents provided by each of the applications. The preference data may be stored in the memory 230, and retrieved by the processor 200 and used as necessary.

For example, a message sent from a person with high preference may always be disposed on the top irrespective of time of receiving the message, while a message from a person with low preference may be displayed in the order of time.

The examples where the preferences are adjusted based on various user interactions have been described so far, but it is to be noted that the user may directly change the preference.

FIGS. 13A and 13B are diagrams illustrating an example of a user directly changing the preference for an application on an electronic apparatus, according to an example embodiment of the present disclosure.

Referring to FIG. 13A, the electronic apparatus 100 may display an application manager 1310. The application manager 1310 may be a program with which the user can change setting for an application, such as, deleting an application, changing a storage space of an application, adjusting preference for an application, and so on.

The user may directly adjust the preference for an application he or she prefers, using the application manager 1310.

Referring to FIG. 13B, the user has changed the preference for the TTT talk application to the highest rank. The electronic apparatus 100 may store the directly-changed preference data in the memory 230, and the processor 200 may retrieve and use the data as necessary.

The example embodiments of varying the forms of notification information based on the preference determined with the methods described above, or various display options for the notification information for displaying additional notifications to the user, will be described below.

Figures 14A, 14B:
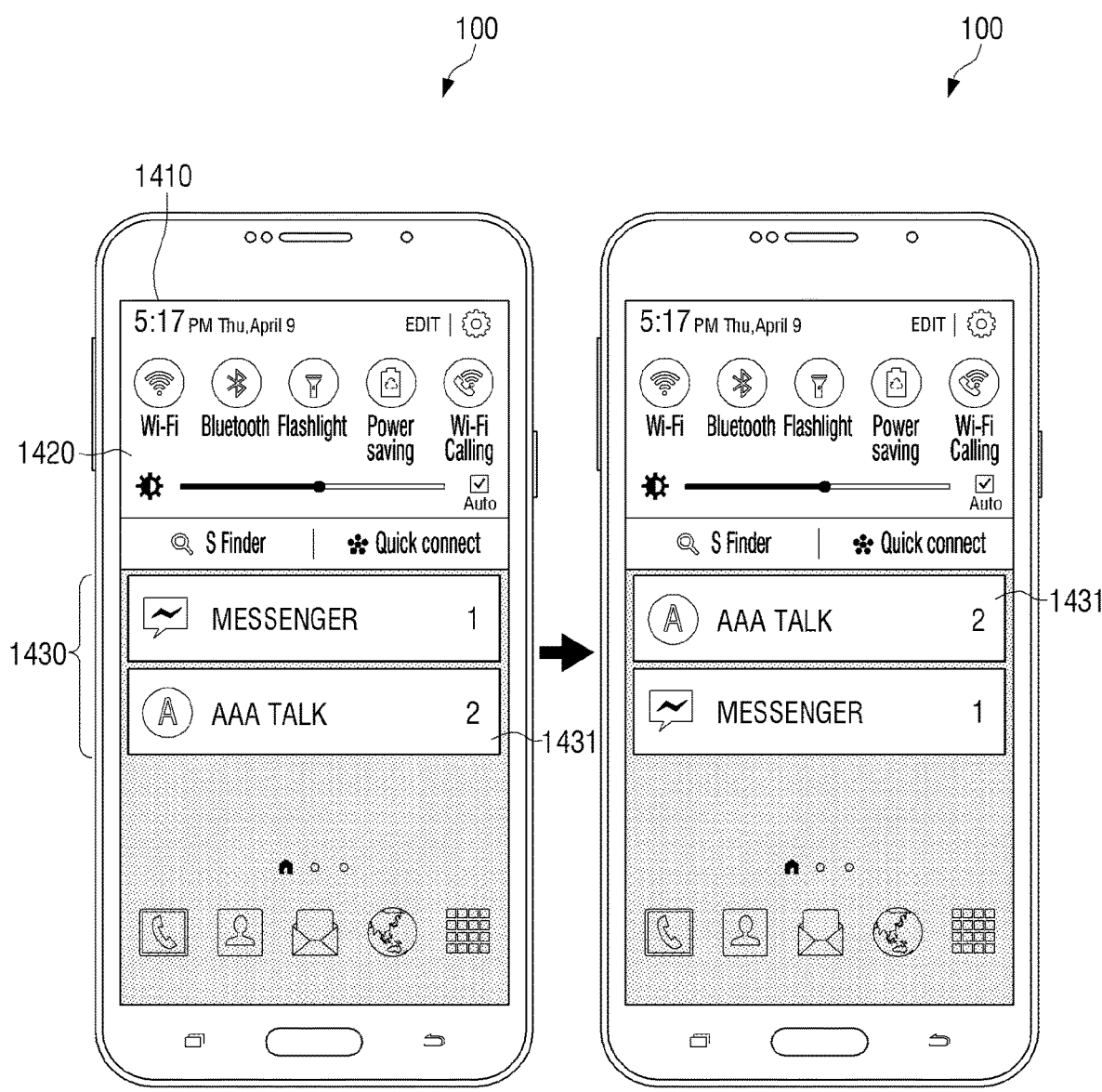
FIGS. 14A and 14B are diagrams illustrating an example electronic apparatus changing an order of notification by reflecting a result of preference according to an example embodiment of the present disclosure.

FIGS. 14A and 14B are diagrams illustrating an example of an electronic apparatus changing an order of notification information by reflecting a result of preference, according to an example embodiment of the present disclosure.

Referring to FIG. 14A, the electronic apparatus 100 may display a notification window 1420 on a display 1410. The notification window 1420 may display a plurality of notification information 1430 including, for example, notification information 1431. The electronic apparatus 100 may display the notification information 1431 generated from a talk application.

Referring to FIG. 14B, the electronic apparatus 100 may display a plurality of notification information 1430 on the notification window 1420 by reflecting the user preference. FIG. 14B illustrates the AAA talk application having increased preference.

For example, compared to FIG. 14A, a hangout AAA talk notification information 1431 is changed to the top rank among a plurality of notification information 1430. Accordingly, the user is able to find the AAA talk notification information 1431 with high preference than a plurality of other notification information 1430 and check the content more easily.

Figures 15A, 15B:
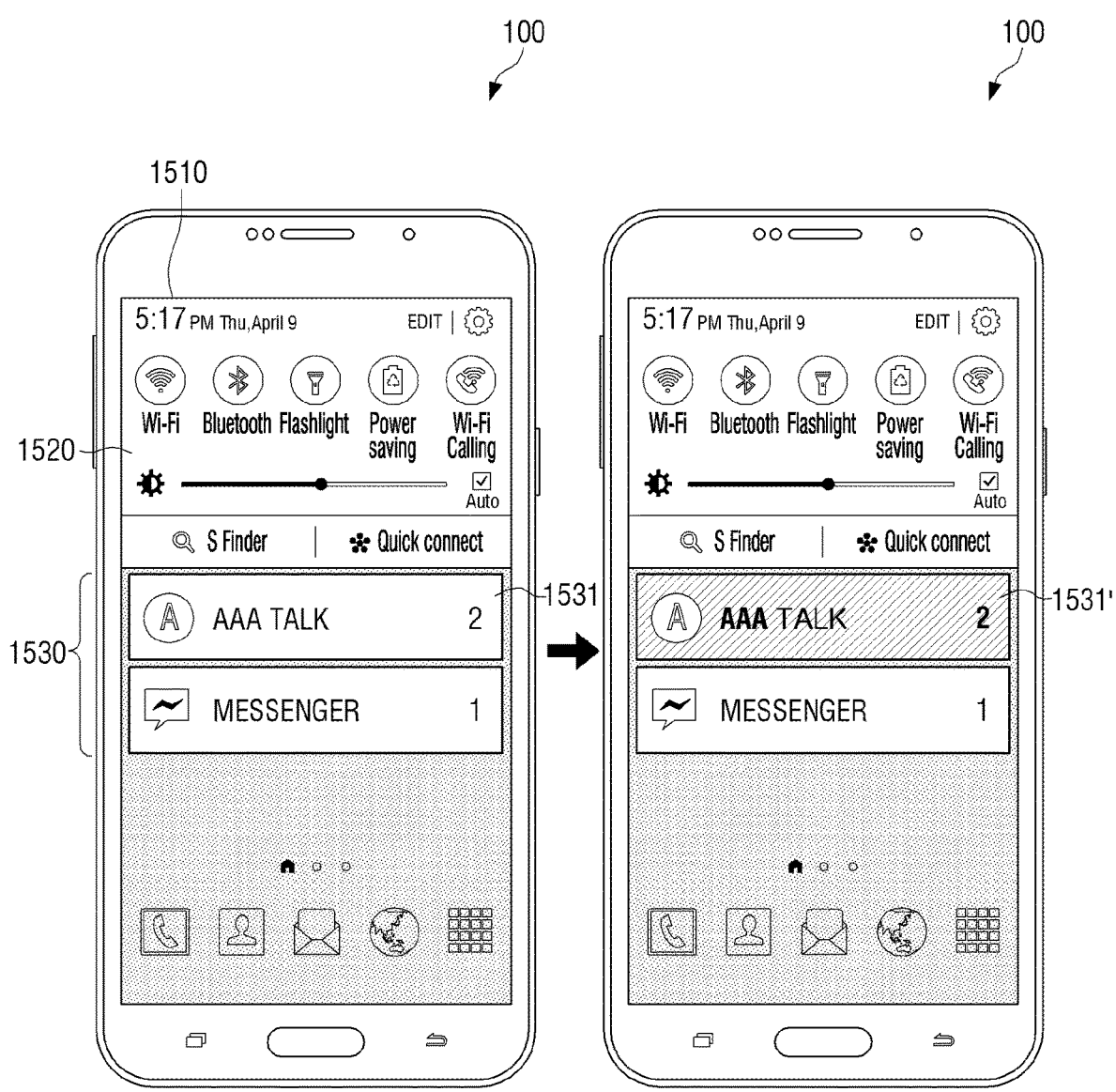
FIGS. 15A and 15B are diagrams illustrating an example electronic apparatus changing a form of a notification by reflecting a result of preference according to another example embodiment of the present disclosure.

FIGS. 15A and 15B are diagrams illustrating an example of an electronic apparatus changing forms of notification information by reflecting a result of preference, according to another example embodiment of the present disclosure.

Referring to FIG. 15A, the electronic apparatus 100 may display a notification window 1520 on a display 1510. The notification window 1520 may display a plurality of notification information 1530 including, for example, notification information 1531. The electronic apparatus 100 may display notification information 1531 generated at a talk application.

Referring to FIG. 15B, the electronic apparatus 100 may reflect the user preference and display a plurality of notification information 1530 on the notification window 1520. FIG. 15B illustrates an example in which the preference for AAA talk application is increased.

For example, compared to FIG. 15A, the texts of the AAA talk application notification information 1531' may be displayed in greater width or thickness, with the notification information 1531' also being displayed in a different color from the other notification information 1530. Accordingly, the user is able to find the notification information 1531' of the AAA talk application with higher preference than the other plurality of notification information 1530 and check the content.

Various example embodiments of changing the display options for the notification window based on preferences have been described above. However, the display options may be changed based on the preferences on a variety of other fields than the notification window. For example, the notification icon displayed on the status indication bar may also be displayed differently based on preferences.

FIGS. 16A and 16B are diagrams illustrating an example of an electronic apparatus reflecting a result of preference and changing an order of notification icons displayed on the status indication bar, according to an example embodiment of the present disclosure.

Referring to FIG. 16A, the electronic apparatus 100 may display a status indication bar 1620 on an upper end of the display 1610. The status indication bar 1620 may display a plurality of icons. For example, the electronic apparatus 100 may display, on the status indication bar 1620, vibration mode on/off 1633, alarm set on/off 1634, service area signal intensity 1635, battery charge 1236, or the like. In addition, the electronic apparatus 100 may display the received notification information in a form of simple icons 1631, 1632 on the status indication bar.

Referring to FIG. 16B, the electronic apparatus 100 may set a status indication bar 1620 by reflecting the user preferences. FIG. 16B illustrates an example in which the preference for the AAA talk application is increased.

For example, compared to FIG. 16A, the icon 1632 of the AAA talk application is moved to the leftmost side to a plurality of other icons 1630. Accordingly, the user is able to find the AAA talk application icons 1632 with higher preference than a plurality of other icons 1630 and check the content more easily.

FIGS. 17A and 17B are diagrams illustrating an example of an electronic apparatus providing an additional function to the notification information by reflecting a result of preference, according to an example embodiment of the present disclosure.

The notification information generated at an application with high user preference may be additionally supported with functions distinguished from the notification information with low preference.

Referring to FIG. 17A, the electronic apparatus 100 may display a notification window 1720 on a display 1710. The notification window 1720 may display a plurality of notification information 1730 including, for example, notification information 1731. The electronic apparatus 100 may display notification information 1731 generated at a TTT talk application.

Referring to FIG. 17B, the electronic apparatus 100 may display a plurality of notification information 1730 on the notification window 1720 by reflecting the user preference. FIG. 17B illustrates an example in which the preference for the TTT talk application is increased.

For example, the user may drag the notification information 1731 of the TTT talk application displayed in FIG. 17A to a direction of lower end of the electronic apparatus 100. Then the electronic apparatus 100 may display the TTT talk notification information 1731' as illustrated in FIG. 17B. The TTT talk notification information 1731' may display all the notification windows currently processed at the TTT talk application of the user. In this state, the user may select a specific talk window. Then the TTT talk application may be activated, and the user is allowed to enter the TTT talk application with the specific talk window being displayed.

As described above, the electronic apparatus 100 may provide the distinguished function to the notification information generated at an application with high user preference, differently from the notification information with low preference, and accordingly, the use is able to use the notification information of the application with high preference more easily than the notification information of the application with low preference.

Figures 18A, 18B:
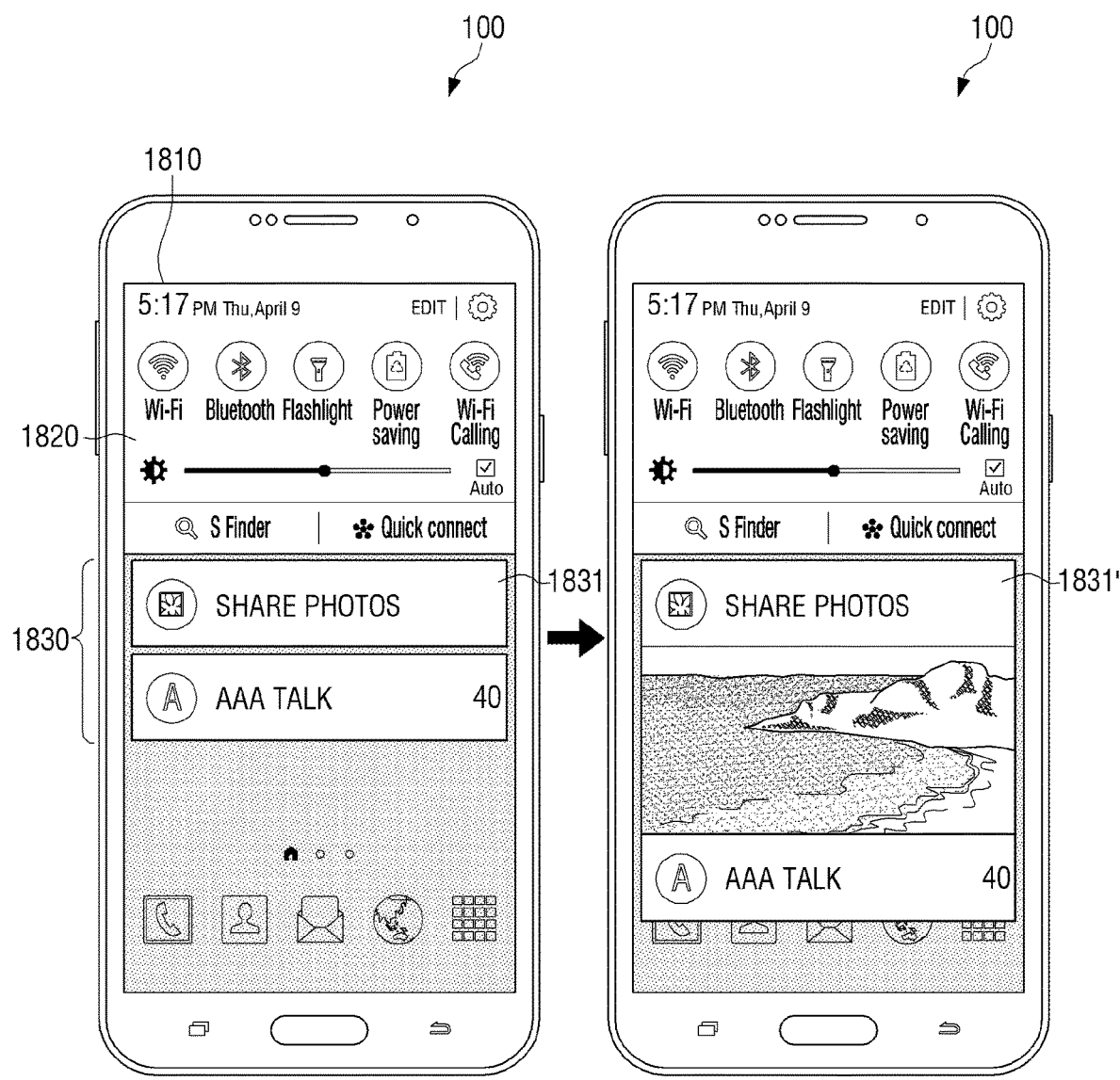
FIGS. 18A and 18B are diagrams illustrating an example electronic apparatus providing an additional function to a notification by reflecting a result of preference, according to another example embodiment of the present disclosure.

FIGS. 18A and 18B are diagrams illustrating an example of an electronic apparatus providing additional information to the notification information by reflecting a result of preference, according to another example embodiment of the present disclosure.

The notification information generated at an application with high user preference may be additionally supported with distinguished functions than notification information with low preference.

Referring to FIG. 18A, the electronic apparatus 100 may display a notification window 1820 on a display 1810. The notification window 1820 may display a plurality of notification information 1830 including, for example, notification information 1831. The electronic apparatus 100 may display the notification information 1831 generated at a photo-sharing application.

Referring to FIG. 18B, the electronic apparatus 100 may reflect user preferences and display a plurality of notification information 1830 on the notification window 1820. FIG. 18B illustrates an example in which the preference for the photo-sharing application is increased.

For example, compared to FIG. 18A, the electronic apparatus 100 may provide a preview screen of a photo to be shared at a photo-sharing application notification information 1831'. Accordingly, the user is able to check the photo available for sharing with himself or herself without having to do separate operation.

FIGS. 19A and 19B are diagrams illustrating an example of an electronic apparatus changing a form of notification information by reflecting a result of preference, according to an example embodiment of the present disclosure.

Referring to FIG. 19A, the electronic apparatus 100 may display a notification window 1920 on a display 1910. The notification window 1920 may display notification information 1930. The electronic apparatus 100 may display notification information 1930 generated at a talk application. The talk application notification information 1930 may also display the number of currently-executed talk windows on the talk application.

Referring FIG. 19B, the electronic apparatus 100 may reflect the user preferences and display a plurality of notification information 1931, 1932 on the notification window 1920. FIG. 19B illustrates an example in which preference for a specific person is increased in the same talk application.

For example, compared to FIG. 19A, the electronic apparatus 100 may display a talk window with the specific person with high preference as a separate notification information 1931. By doing so, the user may save inconveniences of having to select the notification information 1930 representing only the number of talk windows, activate the talk application, and then enter the talk window with the preferred, specific person.

Figures 20A, 20B:
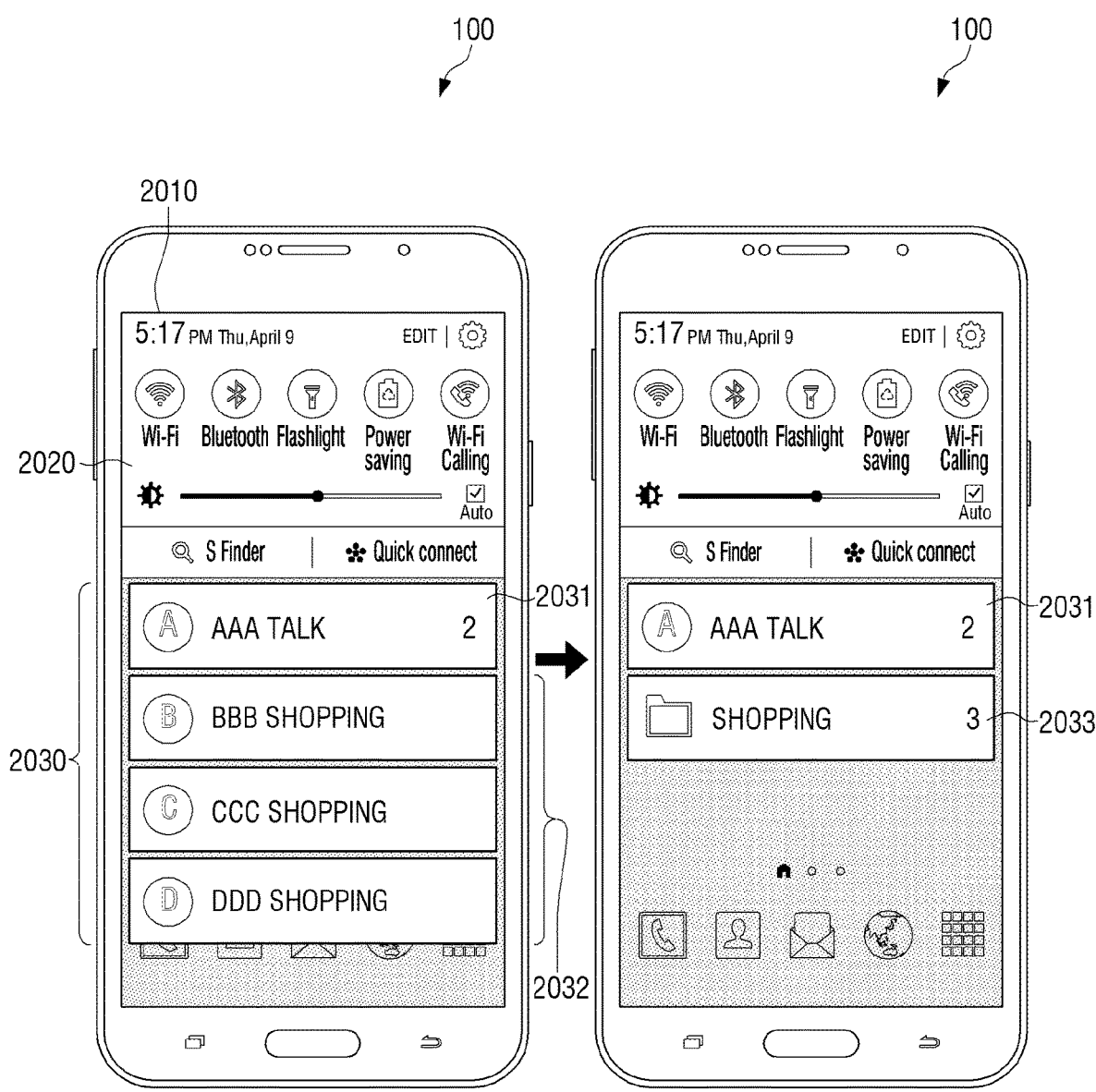
FIGS. 20A and 20B are diagrams illustrating an example electronic apparatus changing a form of a notification by reflecting a result of preference according to another example embodiment of the present disclosure.

FIGS. 20A and 20B are diagrams illustrating an example of an electronic apparatus changing a form of notification information by reflecting a result of preference, according to another example embodiment of the present disclosure.

Referring to FIG. 20A, the electronic apparatus 100 may display a notification window 2020 on a display 2010. The notification window 2020 may display a plurality of notification information 2030 including, for example, notification information 2031 and 2032. The electronic apparatus 100 may display notification information 2032 generated at a plurality of shopping applications.

Referring to FIG. 20B, the electronic apparatus 100 may reflect the user preferences and display a plurality of notification information 2031, 2033 on the notification window 2020. FIG. 20B illustrates an example in which the preference for the shopping application is decreased.

For example, compared to FIG. 20A, the notification information 2032 of the shopping applications may be changed into one shopping folder notification information 2033 and displayed. Rather than displaying the entire notification information 2032 of the low-preference applications, it may more suit the intention of the user to place the notification information 2032 with similar characteristics into a folder once there are generated at least a certain number of such notification information 2032. Accordingly, the user is able to focus on the high-preference application notification information 2031 rather than low-preference application notification information 2032.

Upon receiving at least a preset number of low-preference application notification information 2032, the electronic apparatus 100 may group the notification information 2032 into one folder notification information 2033 irrespective of types of the notification information 2032. The electronic apparatus 100 may divide the contents including the low-preference application notification information 2032 and generate folder notification information 2033 for each of characteristics when at least a certain number of notification information 2032 with similar characteristics is received.

The electronic apparatus 100 may not display on the notification window 2020 the notification information 2032 generated at a low-preference application, and then generate the notification information 2020 into folder notification information 2033 and display it on the notification window 2020 when a preset time elapses.

When an application included in the folder notification information 2033 newly generates notification information and the electronic apparatus 100 receives such notification, the electronic apparatus 100 may cause the notification information of the corresponding application to be separated from the folder notification information 2033 and displayed.

Figure 21:
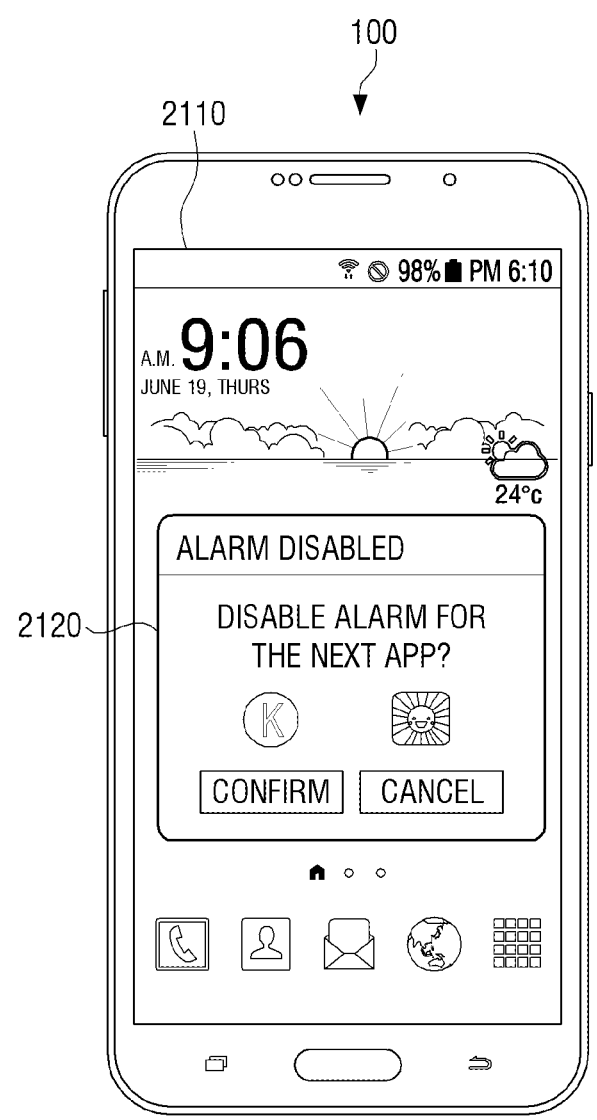
FIG. 21 is a diagram illustrating an example electronic apparatus displaying an additional notification by reflecting a result of preference according to an example embodiment of the present disclosure.

FIG. 21 is a diagram illustrating an example electronic apparatus displaying an additional notification by reflecting a result of preference, according to an example embodiment of the present disclosure.

When the user continuously deletes notification information of a specific application without checking the same, this represents the user's intention that the user does not want to receive the notification from such application. In order to cancel transmission of the notification from the specific application, it may generally be necessary to inactivate the corresponding application, or access a website that manages the corresponding application and cancels notification transmission.

However, as described above, when the user continuously repeats an operation of decreasing the preference for the displayed notification information, the electronic apparatus 100 may confirm the user's intention from the repeated notification cancellation.

For example, referring to FIG. 21, the electronic apparatus 100 may display a popup message 2120 on a display 2110. The popup message 2120 is inquiring the user to select whether or not to cancel reception of notification from a certain application.

For example, when the user repeats performing an operation of decreasing the preference for at least a preset number of times for the notification information generated at a certain application, a popup message 2120 may be displayed, inquiring as to whether or not to cancel the notification.

Accordingly, the user is able to cancel notification from a specific application easily, e.g., without having to execute a specific application or visit the website that manages the application.

Figure 22:
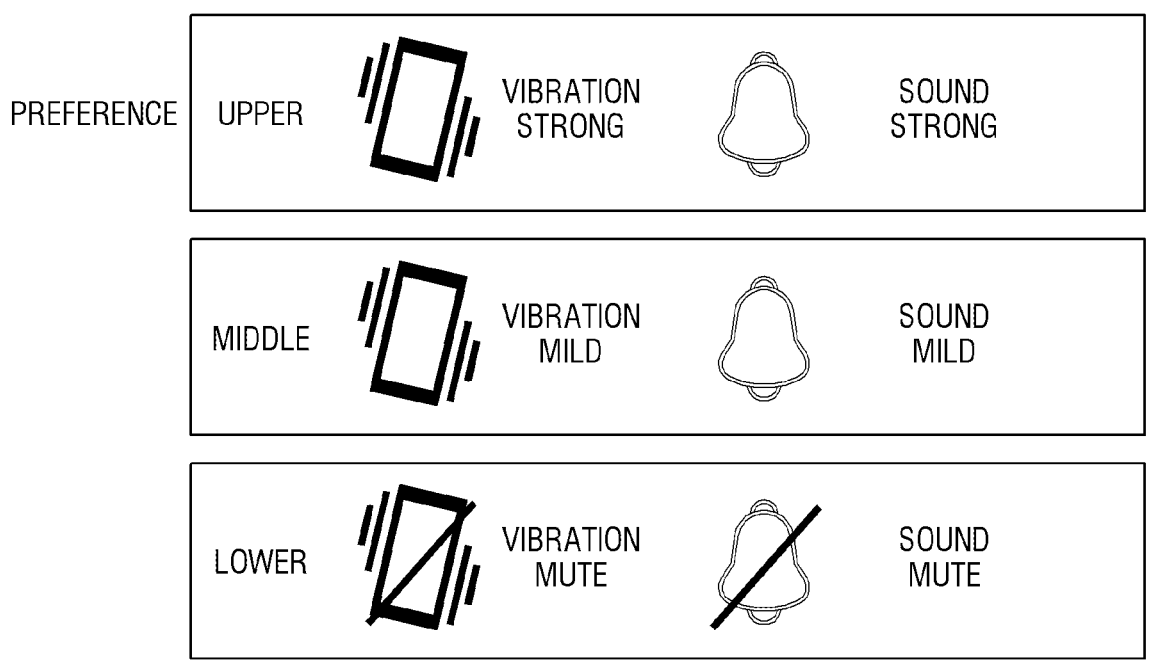
FIG. 22 is a diagram illustrating an example electronic apparatus changing an intensity of a notification by reflecting a result of preference according to an example embodiment of the present disclosure.

FIG. 22 is a diagram illustrating an example electronic apparatus adjusting intensity of notification by reflecting a result of preference, according to an example embodiment of the present disclosure.

Generally, the electronic apparatus 100 may notify the user of reception of the notification information using vibration or sound. The user may adjust the intensity of the vibration or sound. According to an example embodiment of the present disclosure, the electronic apparatus 100 may automatically adjust the intensity of the vibration or sound based on the preference for an application or specific person.

For example, referring to FIG. 22, the electronic apparatus 100 may generate a strong vibration when receiving notification information generated at a "high" user preference application or transmitted from a specific person. When in sound mode, the electronic apparatus may not generate notification sound.

Further, the electronic apparatus 100 may generate mild vibration when receiving notification information generated at a "middle user preference application or notification information transmitted from a specific person. When in sound mode, the electronic apparatus may not generate notification sound.

Further, the electronic apparatus 100 may not generate vibration when receiving notification information generated at a "low user preference application or notification information transmitted from a specific person. When in sound mode, the electronic apparatus may not generate notification sound.

Similarly, the electronic apparatus 100 may configure the types of notifications differently, based on the user preferences. For example, the electronic apparatus may generate sound, vibration, and screen display when receiving notification information generated at a "high" user preference application or notification information transmitted from a specific person.

Further, the electronic apparatus may generate sound, and screen display when receiving notification information generated at a "middle" user preference application or notification information transmitted from a specific person.

Further, the electronic apparatus may generate only the screen display when receiving notification information generated at a "low" user preference application or notification information transmitted from a specific person. When the user preference is "low", the electronic apparatus 100 may collect the notifications and display the collected notifications at once, rather than generating notification each time. Of course, the types of notifications based on preferences which not limited herein, and various other distinctive forms may be configured.

Figure 23:
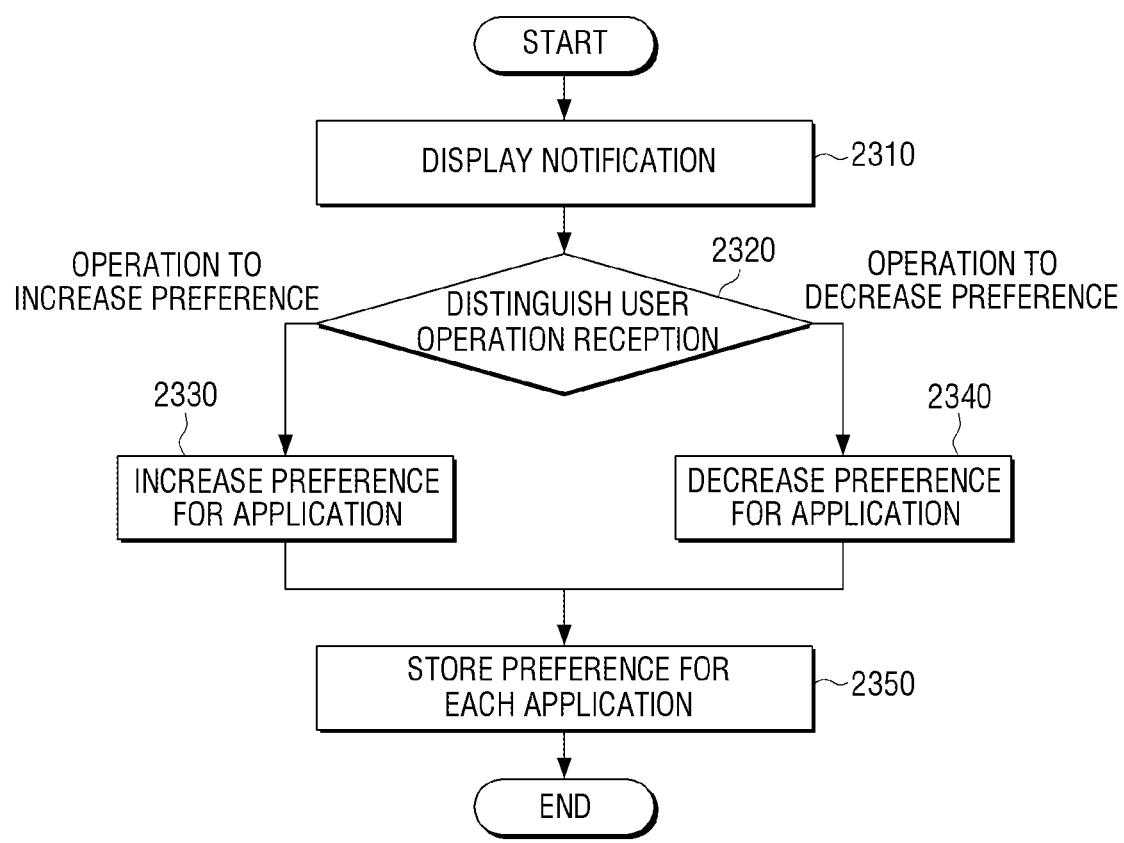
FIG. 23 is a flowchart illustrating an example electronic apparatus dividing operations of a user to notifications and storing the result, according to an example embodiment of the present disclosure.

FIG. 23 is a flowchart illustrating an example electronic apparatus dividing operation of a user regarding notification information and storing the same, according to an example embodiment of the present disclosure.

At operation 2310, the electronic apparatus 100 may display notification information on a display. At operation 2320, the electronic apparatus 100 may receive an operation of the user selecting or dragging the notification information. At operation 2320, the electronic apparatus 100 may determine whether the user's operation is to increase the preference for the application that generates notification information or the content included in the notification information, or to decrease the preference.

At operation 2330, the electronic apparatus 100 may increase the preference for the application that generates notification information or the content included in the notification information, when determining that the user has performed the operation of increasing the preference.

At operation 2340, when determining that the user has performed an operation of decreasing the preference, the electronic apparatus 100 may decrease the preference for the application that generates the notification information or the content included in the notification information.

At operation 2350, the electronic apparatus 100 may store data for the collected preferences in a memory, or the like. The electronic apparatus 100 may store how many times the operation of increasing or decreasing the preference for each of the applications or for the content included in the notification information has occurred.

The electronic apparatus 100 may determine where the preference for the application or the content belongs, e.g., among high, middle, and low preferences, based on the collected preference data. In this example, when the operation of increasing or decreasing the preferences is repeated at least a threshold number of times, the electronic apparatus 10 may change the preference for the application or the content. The 'threshold number of times' may be set by a manufacturer, or arbitrarily adjusted by the user. For more specific classification, each of the high, middle, and low preference stages may be again divided into high, middle, and low sub-stages, but is not limited thereto.

FIG. 23 illustrates that the preferences are adjusted for each of the applications and stored. However, note that many different example embodiments are possible. For example, the display options for the notification information may be stored in advance. In this example, the display options for the corresponding notification information may be frequently changed each time the user interaction is generated for the corresponding notification information, and according to a type of such interaction.

Figure 24:
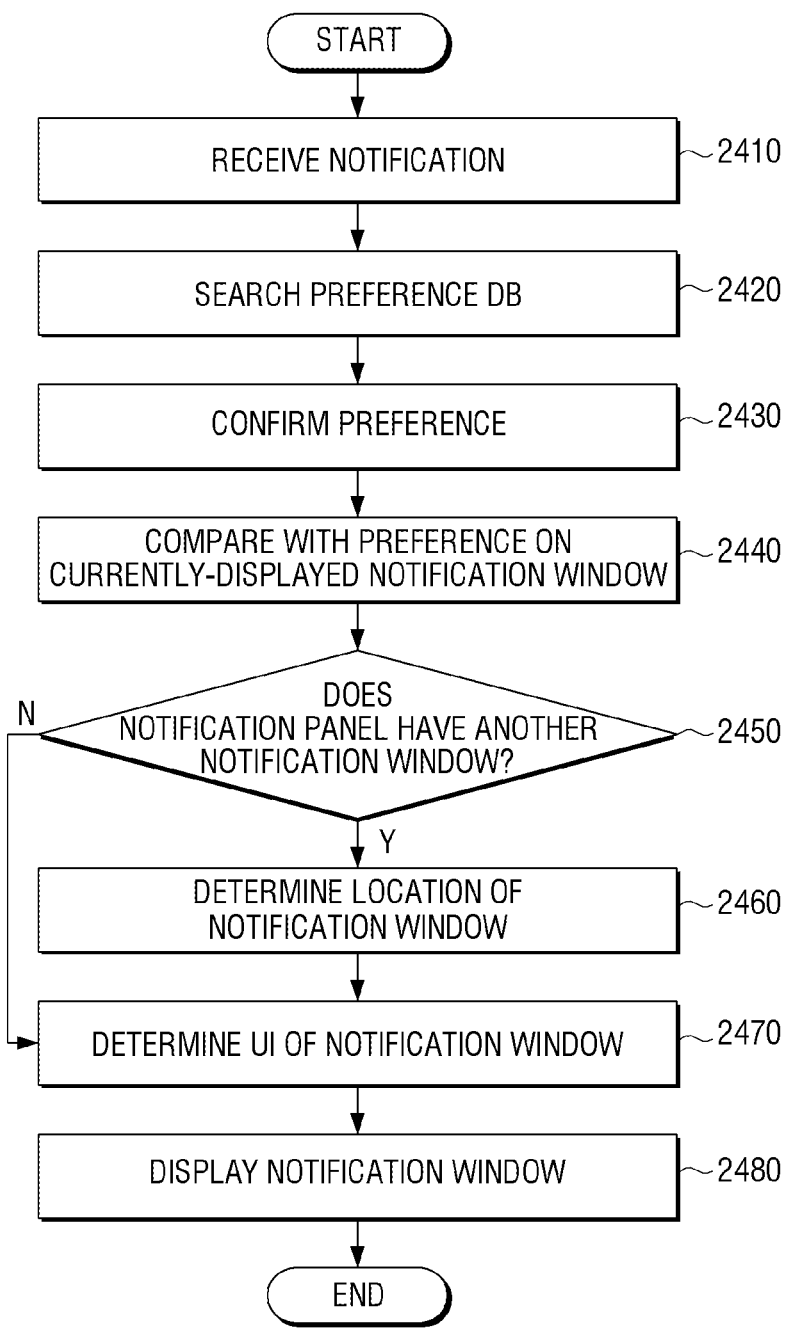
FIG. 24 is a flowchart illustrating an example electronic apparatus changing a notification by utilizing data for a stored preference, according to an example embodiment of the present disclosure.

FIG. 24 is a flowchart illustrating an example electronic apparatus changing notification information by utilizing data about the stored preferences, according to an example embodiment of the present disclosure.

At operation 2410, the electronic apparatus 100 may receive a notification generated at an application. At operation 2420, upon receiving the notification, the electronic apparatus 100 may search the preference data of the application that generates the notification. For example, the electronic apparatus 100 may search to determine to which of the high, middle and low preference stages the preference of the application belongs. Further, the electronic apparatus 100 may further search to determine the high, middle, and low sub-stages of each of the high, middle, and low preference stages.

At operation 2430, the electronic apparatus 100 may check the preference for the application. At operation 2440, the electronic apparatus 100 may compare the preference for the application it 100 checked, with the preference for the applications that currently display the notification information on the notification window. At operation 2450, the electronic apparatus 100 may determine whether or not there is notification information currently present on the notification window.

At operation 2460, when the notification information is being currently displayed on the notification window, the electronic apparatus 100 may determine a location of the notification information of the application. At operation 2470, the electronic apparatus 100 may determine a User Interface (UI) to display the notification information. At operation 2480, the electronic apparatus 100 displays the notification information on the notification window.

At operation 2450, when the notification information is currently not present on the notification window, the electronic apparatus 100 may determine a UI to display the notification information at operation 2470.

The method for changing and displaying the notification information by reflecting the user preferences described above may be performed on the electronic apparatus 100 in FIG. 2, but not necessarily limited thereto.

Figure 25:
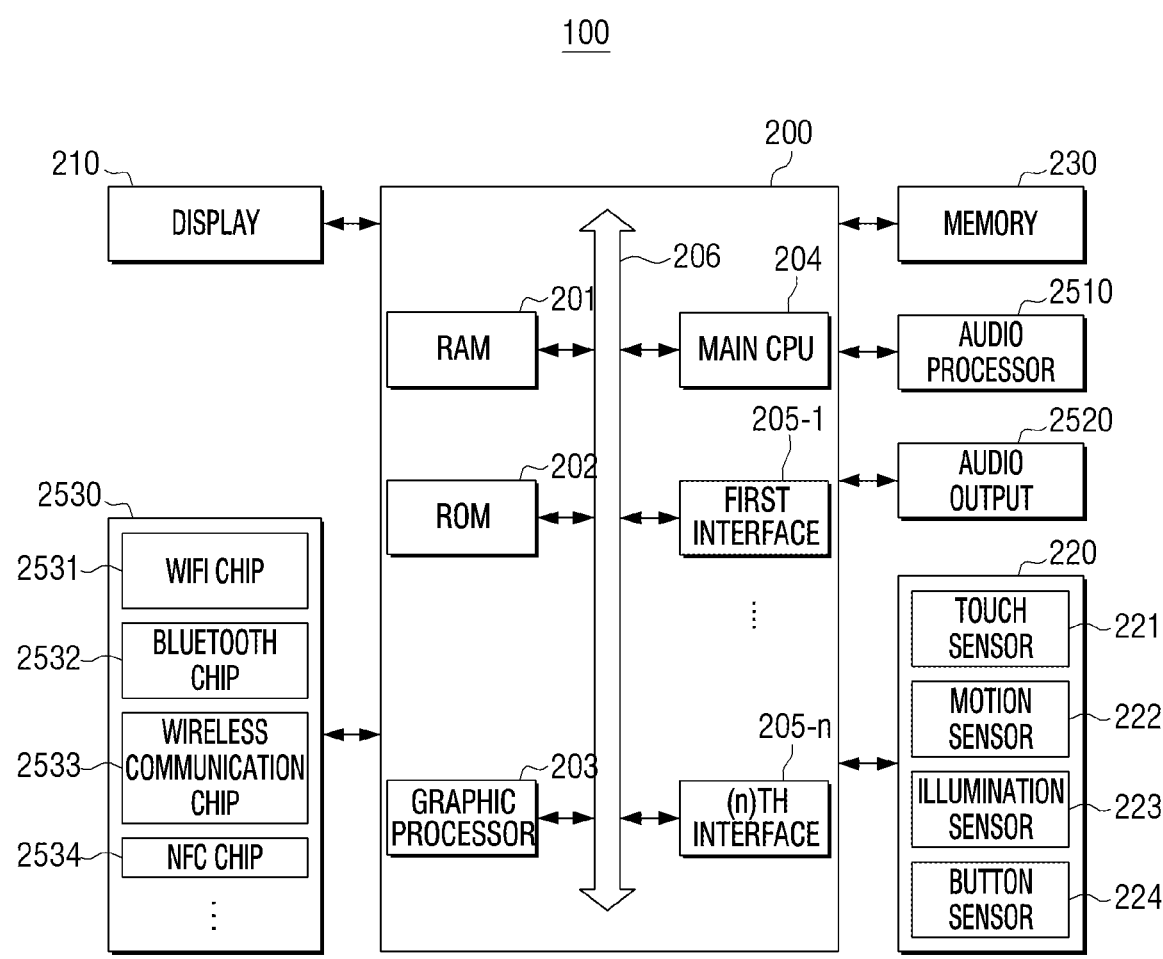
FIG. 25 is a block diagram illustrating an example configuration of an electronic apparatus according to an example embodiment of the present disclosure.

FIG. 25 is a block diagram illustrating an example configuration of an electronic apparatus according to an example embodiment of the present disclosure.

As illustrated in FIG. 25, the electronic apparatus 100 may include at least one of a display 210, a communicator (e.g., including communication circuitry) 2530, a memory 230, an audio processor 2510, an audio output 2520, a sensor 220, and a processor (e.g., including processing circuitry) 200. Meanwhile, the configuration of the electronic apparatus 100 illustrated in FIG. 25 is provided only for illustrative purpose, and the example embodiments are not necessarily limited to the block diagram described above. Accordingly, depending on the type of the electronic apparatus 100 or the purpose of the electronic apparatus 100, portion of the configuration of the electronic apparatus 100 illustrated in FIG. 25 may be omitted, modified, or added.

The display 210 may display a variety of screens in a display region. The variety of screens may include notification window, notification information, or the like, for example. The variety of screens may display various types of contents (e.g., images, videos or texts), and UI elements to control the content or the electronic apparatus 100.

The display 210 may have various sizes. For example, the display 210 may have a size of 3 inches, 4 inches, 4.65 inches, 5 inches, 6.5 inches, 8.4 inches, or the like.

The display 210 may be implemented as various forms of display panel. For example, the display panel may be implemented with a variety of display technologies such as liquid crystal display (LCD), organic light emitting diodes (OLEDs), active-matrix organic light-emitting diode (AM-OLED), liquid crystal on silicon (LcoS), or digital light processing (DLP), or the like, but is not limited thereto.

The display 210 may be coupled with at least one of front region, side region, and rear region of the electronic apparatus 100, in a flexible display form.

The display 210 may be implemented as a layer-structure touch screen by being coupled with the touch sensor 221. The touch screen may have not only a display function, but also a function to detect not only the touch input location, touched area, but also touch input pressure. Further, the touch screen may have a function to detect not only the substantial real-touch, but also the proximity touch.

The communicator 2530 may include various communication circuitry configured to perform a communication with various types of external devices according to various types of communication techniques. The communicator 2530 may include various communication circuitry, such as, for example, and without limitation, at least one of a wife chip 2531, a Bluetooth chip 2532, a wireless communication chip 2533, and an NFC chip 2534. The processor 200 may perform a communication with an external server or various external devices using the communication circuitry of the communicator 2530. Part of the notification information the electronic apparatus 100 displays on the notification window may be the data received from an external server or various external devices using the communicator.

The audio processor 2510 is configured to process the audio data of the image content. The audio processor 2510 may perform various processing including decoding or amplification of the audio data, noise filtering, and so on. The audio data processed at the audio processor 2510 may be outputted to the audio output 2520.

The audio output 2520 is configured to output not only the various audio data passed through various processing jobs such as decoding or amplification, and noise filtering by the audio processor 2510, but also various notification sounds or voice messages. Specifically, the audio output 2520 may be implemented as a speaker, but this is only an example embodiment. Accordingly, the audio output 2520 may be implemented as an output terminal that can output audio data.

The sensor 220 senses various user inputs. Further, the sensor 220 may detect at least one of various changes including posture change, illuminance change, acceleration change, or the like, and transmit corresponding electrical signals to the processor 200. For example, the sensor 220 may sense the changes in the status occurring based on the electronic apparatus 100, generate the sense signals accordingly, and transmit these to the processor 200.

In an example embodiment, the sensor 220 may include various sensors, and power may be supplied to at least one sensor set during driving of the electronic apparatus 100 (or based on the user setting) according to controlling of the sensor 220 to sense the status changes of the electronic apparatus 100. In this example, the sensor 220 may include various sensors, and may be configured to include at least one of all forms of sensing devices that can detect the status change of the electronic apparatus 100. For example, the sensor 220 may be configured to include at least one sensor of various sensing devices such as touch sensor 221, acceleration or motion sensor 222, gyro sensor (not shown), illumination sensor 223, proximity sensor (not shown), pressure sensor (not shown), noise sensor (e.g., microphone) (not shown), video sensor (e.g., camera module) (not shown), pen sensor (not shown), timer (not shown), a button sensor 224, or the like, but is not limited thereto.

According to the purpose of sensing, the sensor 220 may be divided into a touch sensor 221, a motion sensor 222, an illumination sensor 223, and a button sensor 224, but example embodiments are not limited thereto. Accordingly, the sensor 220 may be divided according to more varied purposes.

Further, such division is not specifically limited to a physical division. Accordingly, at least one sensor may be coupled to perform a role of the sensors 221, 222, 223, 224. Further, in certain implementation, part of the configuration or the function of the sensor 220 may be included in the processor 200.

The touch sensor 221 may sense a finger input and output a touch event value that corresponds to the sensed touch signal. The touch panel of the touch sensor 221 may be mounted under the display 210. For example, the touch sensor 221 may sense a touch, or a touch and drag as described above in the example embodiments. Upon sensing a touch and drag, the touch sensor 221 transmits coordinate values for the touched location to the processor 200. The processor 200 may determine the characteristics of the touch and drag based on the coordinate values, and perform an operation such as notification information preview, notification information delete, and so on. These operations have already been described above and a detailed description thereof will not be repeated below for the sake of brevity.

The touch sensor 221 may acquire output signals from the touch sensor according to the user input. The touch sensor 221 may determine from the signal values the user input information such as touch location, touch coordinates, number of touches, touch intensity, cell ID, angle of touch, or area of touch, and determine a type of touch input using the calculated user input information. The touch sensor 221 may determine the type of touch input using the touch recognition algorithm and touch pattern data, and so on in the memory (not illustrated) of the touch panel. When the type of touch input is determined, the touch sensor 221 may transmit the information regarding the type of touch input to the processor 200. The touch sensor 221 may sense the proximity touch location (or, hovering location) inputted by the user, as described above.

The processor 200 may include various processing circuitry configured to perform certain functions on behalf of the touch sensor 221. For example, the touch sensor 221 may transmit the signal values acquired from the touch sensor, or the user input information calculated from the signal value to the processor 200. The processor 200 may determine the type of touch input, with the received signal value or user input information, using the touch recognition algorithm and touch pattern data stored in the memory 230. In an example, when a phone application is being executed, from the user input information of the type of touch input, the processor 200 may detect that a call button of the phone application has been selected and transmit a request for call to a counterpart via the communicator 2530.

The motion sensor 222 may sense a motion (e.g., rotating motion, tilting motion, etc.) of the electronic apparatus 100, using at least one of the acceleration sensor, tilt sensor, gyro sensor, and 3-axis magnetic sensor. The motion sensor 222 may then transmit the generated electrical signal to the processor 200. In an example, the motion sensor 222 may measure a combined acceleration of motion acceleration and acceleration of the electronic apparatus 100, but may also measure the gravity acceleration only when the electronic apparatus 100 has no motion.

The illumination sensor 223 may sense the ambient brightness of the electronic apparatus 100 using an illuminance sensor. The illumination sensor may sense the brightness using a photovoltaic cell, and at a very low brightness, a photoelectric tube may be used. As an example of the illumination sensor, a CDS illumination sensor may be installed on both surfaces of the electronic apparatus 100 to sense the ambient brightness of the electronic apparatus 100. The illumination sensor 223 may convert the voltage acquired through the illumination sensor into digital value and transmit the same to the processor 200.

The sensor 220 may additionally include a pen sensor (e.g., pen recognition panel) (not illustrated). The pen sensor may sense a user's pen input based on the user maneuvering the touch pen (e.g., stylus pen) or digitizer pen, and output a pen proximity event value or a pen touch event value. The pen sensor may be implemented as an EMR manner, for example, and may sense touch or proximity input based on changes in the intensity of electromagnetic field by the approach of the pen or by the pen touch.

The microphone (not illustrated) may sense user voice (e.g., begin photographing, stop photographing, end photographing, etc.) to control medical equipment through the electronic apparatus 100, and perceive the user voice through the voice recognition module. The result of recognition may then be transmitted to the processor 200. The voice recognition module may be a part of the processor 200 rather than the microphone, or may be located as outside the electronic apparatus 100.

The processor 200 may include various processing circuitry configured to control the overall operation of the electronic apparatus 100 using various programs stored in the memory 230.

The processor 200 may include RAM 201, ROM 202, graphic processor 203, main CPU 204, first to (n)th interfaces 205 through 205-n, and bus 206. RAM 201, ROM 202, graphic processor 203, main CPU 204, first to (n)th interfaces 205 through 205-n, and so on may be coupled with one another by the bus 206.

The RAM 201 stores O/S and application programs. For example, when the electronic apparatus 100 is booted, the O/S may be stored in the RAM 201, and the various application data selected by the user may be stored in the RAM 201.

The ROM 202 stores a set of instructions for system booting. When the power is supplied in response to the command to turn on, the main CPU 204 copies the O/S stored in the memory 230 onto the RAM 201, and executes the O/S to boot the system. When booting is completed, the main CPU copies various application programs stored in the memory 230 onto the RAM 201, and execute the application programs copied on the RAM 201 to perform various operations.

The graphic processor 203 may generate a screen including items, images, texts, and so on, using a calculator (not illustrated), and a renderer (not illustrated). The calculator may be configured to calculate attribute values such as coordinates, shapes, sizes, colors, and so on according to a screen layout, by which each object will be displayed, using the control command received from the sensor 220. The renderer may be configured to generate various layouts of screens including objects, based on the attribute values calculated at the calculator. The screen generated from such renderer may be displayed in the display region of the display 210.

The main CPU 204 performs booting, using the O/S stored in the memory 230. The main CPU 204 performs various operations using the programs, contents, data, and so on stored in the memory 230.

The first to (n)th interfaces 205-1 through 205-n are coupled with the various elements described above. One of the first to (n)th interfaces 205-1 through 205-n may be a network interface that is connected to external device through a network.

The memory 230 may store programs and data necessary for the operation of the electronic apparatus 100. The memory 230 may be implemented as non-volatile memory, volatile memory, flash memory, hard disk drive (HDD) or solid state drive (SSD), and so on. The memory 230 is accessible by the processor 200, and data reading/recording/modification/deletion/updating may be performed by the processor 200.

Further, the memory 230 may store programs, data, and so on to configure various screens to be displayed on the display region of the display 210. For example, the memory 230 may store the preferences of the applications described above. The forms of notification information to be displayed on the display 210 may be stored based on the preference ranking of the applications. When the notification of the application is generated, the processor 200 may control the operation of determining the form of the notification information to be displayed on the display based on the preference of the corresponding application, and displaying the same.

Figure 26:
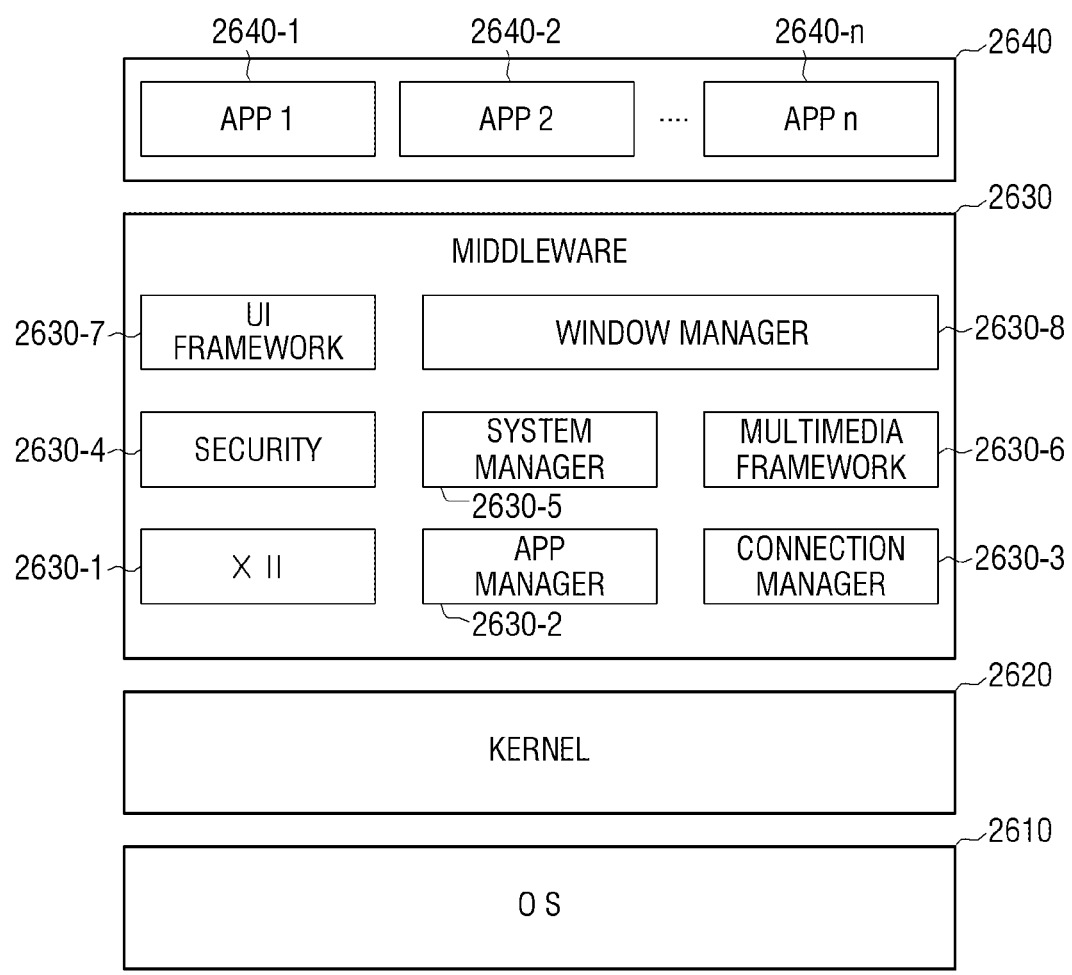
FIG. 26 is a block diagram illustrating an example structure of software stored in an electronic apparatus according to an example embodiment of the present disclosure.

FIG. 26 is a block diagram illustrating an example structure of the software or program module stored in an electronic apparatus according to an example embodiment of the present disclosure.

Hereinbelow, the structure of the software stored in the memory 230 will be described with reference to FIG. 26. According to FIG. 26, the memory 230 may store software including OS 2610, kernel 2620, middleware 2630, applications 2640, and the like.

The operating system (OS) 2610 performs a function of controlling and managing the overall operation of the hardware. That is, the OS 2610 is the class responsible for the basic functions such as hardware management, memory, security, and so on.

The kernel 2620 serves as a passage to deliver the signals including touch signals sensed at the sensor 220, and so on, to the middleware 2630.

The middleware 2630 includes software modules to control the operation of the electronic apparatus 100. According to FIG. 26, the middleware 2630 may include, for example X11 module 2630-1, APP manager 2630-2, connection manager 2630-3, security module 2630-4, system manager 2630-5, multimedia framework 2630-6, UI framework 2630-7, and window manager 2630-8.

The X11 module 2630-1 is provided to receive event signals from the hardware provided in the electronic apparatus 100. The 'event' as used herein may be set as various events including, for example, event of sensing user gesture, event of generating system alarm, event of executing or ending specific program, and so on.

The APP manager 2630-2 is a module provided to manage the status in which the respective applications 2640 installed in the memory 230 are executed. When the application executing event is sensed from the X11 module 2630-1, the APP manager 2630-2 calls an application corresponding to such event and executes the same.

The connection manager 2630-3 is a module provided to support wired or wireless network connection. The connection manager 2630-3 may include various sub-modules such as DNET module, UPnP module, and so on.

The security module 2630-4 is a module provided to support the hardware certification, permission, secure storage, and so on.

The system manager 2630-5 monitors the status of the respective elements of the electronic apparatus 100 and provides the result of monitoring to the other modules. If battery charge is insufficient, or an error is generated, or a communication connection is severed, the system manager 2630-5 may provide such result of monitoring to the UI framework 2630-7 and output notification message or sound. The notification message may be displayed in the form of the notification information described above.

The multimedia framework 2630-6 is a module provided to playback multimedia contents either stored in the electronic apparatus 100 or provided from an external source. The multimedia framework 2630-6 may include a player module, a camcorder module, a sound processing module, and so on. Accordingly, the module may perform an operation of playing back the multimedia contents to generate screen and sound and playing the same.

The UI framework 2630-7 may include an image compositor module that constructs various UI elements, a coordinate compositor to calculate coordinates at which the UI element is to be displayed, a rendering module to render the constructed UI element at the calculated coordinates, and 2D/3D UI toolkit to provide tools to construct 2D or 3D form of UI.

The notification information described above may be generated through the UI framework 2630-7. For example, while monitoring the status of the electronic apparatus 100, when the system manger 2630-5 finds out problems such as short of battery charge or severed communication, and so on, the system manager 2630-5 may send the result to the UI framework 2630-7. The UI framework 2630-7 may configure this into a form of notification information and display it on the display. The content of notification generated at an application may also be transmitted to the UI framework 2530-7, and the UI framework 2630-7 may display this in a form of notification information on the display.

The window manager 2630-8 may sense a touch event using a user's body part or a pen, or sense other input events. When sensing such event, the window manager 2630-8 delivers an event signal to the UI framework 2630-7 so that an operation corresponding to the event is performed.

Additionally, various program modules such as a handwriting module to draw a line based on a trajectory of drag when the user touches and drags the screen, or an angle calculation module to calculate pitch, roll, yaw, and so on based on the sensor value sensed at the motion sensor 222, may be stored in the electronic apparatus 100.

The application module 2640 includes applications 2640-1 through 2640-n to support various functions. For example, program modules such as navigation program module, game module, e-book module, calendar module, notification management module, and so on, to provide a variety of services may be included. These applications may be installed by default, or may be arbitrarily installed by the user during use. When the UI element is selected, the main CPU 204 may execute an application corresponding to the selected UI element, using the application module 2640.

Note that the software structure illustrated in FIG. 26 is provided only for illustrative purpose, and example embodiments are not necessarily limited thereto. Accordingly, some may be omitted or modified, or added, depending on the type of the electronic apparatus 100, or the purpose of the electronic apparatus 100. For example, the memory 230 may be additionally provided with various programs such as a sensing module to analyze the signals sensed at the respective sensors, a messaging module such as a messenger program, a text message program, or an email program, or call info aggregator program module, VoIP module, web browser module, and so on.

As described above, according to various example embodiments of the present disclosure, when the electronic apparatus 100 generates a plurality of notification information, the difficulty of discriminating important notification information to the user can be enhanced.

Further, the electronic apparatus 100 may change the display options by changing the form of notification information to be subsequently displayed, based on the user interaction toward the notification information displayed on the notification window, and as a result, the user can check the notification with ease.

The method of inputting or changing texts according to various example embodiments may be implemented as a program and provided on a display system.

For example, a non-transitory computer readable medium storing a program including steps of displaying notification information according to display options previously stored in the electronic apparatus, and when a user interaction occurs to the notification information, adjusting the display options of the notification information such that the display options are modified based on the type of the user interaction.

The non-transitory computer readable recording medium refers to a medium that can store data semi-permanently. For example, various applications or programs described above may be stored and provided on a non-transitory computer readable recording medium such as CD, DVD, hard disk, blue-ray disk, USB, memory card, ROM, and so on.

The foregoing example embodiments and advantages are merely examples and are not intended to be limiting. The present disclosure can be readily applied to other types of apparatuses. Also, the description of the example embodiments of the present disclosure is intended to be illustrative, and not to limit the scope of the claims.

What is claimed is:

1. An electronic apparatus, comprising:
a display configured to display notifications;
a memory configured to store notification display options for a plurality of applications configured to generate notification information, wherein the notification display option for each of the applications comprises a form of the notification information to be subsequently displayed; and
a processor configured to:
receive notification information from the plurality of applications,
control the display to simultaneously display the received notification information from the plurality of applications based on a preference associated with each of the plurality of applications and based on the notification display option of the corresponding application,
receive a first type of user touch interaction or a second type of user touch interaction on a first displayed notification information regarding a first application of the plurality of applications, wherein the first notification information is to be displayed according to a first notification display option associated with the first application, wherein displaying the first notification information according to the first notification display option includes displaying the first notification information without grouping the first notification information with other displayed notification information into one notification information,
based on a first type of user touch interaction being received, increase the preference for the application that provides the selected notification information, and wherein the first type of interaction comprises a first interaction of selecting the notification information and in response thereto execute application corresponding to the selected notification information, and second interaction of dragging said the notification information in a first direction and in response thereto the electronic apparatus displays corresponding content of the notification as a preview,
based on a second type of user touch interaction being received, decrease the preference for the application that provides the selected notification information, and the second type of interaction comprises a third interaction of dragging the notification information in a second direction and in response thereto delete the notification information and a fourth interaction of selecting a delete menu to delete the notification information; and
based on the decrease in the preference associated with the first application in response to the second type of user touch interaction, change the notification display option of the first application stored in the memory from the first notification display option to a second notification display option different from the first notification display option, and
based on detecting an event for displaying notification information regarding the first application after the first notification information is displayed with the first notification display option, control the display to display second notification information regarding the first application according to the second notification display option, wherein displaying the second notification information according to the second notification display information with one or more other notifications regarding the first application as one notification information, based on the preference associated with the first application being changed, adjust the intensity of at least one of the vibration and sound corresponding to notification information regarding a first application.

2. The electronic apparatus of claim 1, wherein the change in notification display option of the application comprises at least one of: changing a form of notification information, displaying additional notification information, and changing a content of displayed notification information.

3. The electronic apparatus of claim 2, wherein changing the form of notification information comprises at least one of: displaying at least one notification information displayed on the display wherein the notification information is distinguished from other notification information; changing an order of displaying the notification information; separating a portion of the content included in the notification information and displaying the separated portion of the content included in the notification information as separate notification information; and changing an intensity of vibration or sound of the electronic apparatus that generates the notification information.

4. The electronic apparatus of claim 1, wherein the first type of user touch interaction comprises a first interaction of selecting one of the notification information, and a second interaction of dragging one of the notification information in a first direction, and the second type of user touch interaction comprises a third interaction of dragging one of the notification information in a second direction, and a fourth interaction of selecting a delete menu to delete the notification information.

5. The electronic apparatus of claim 4, wherein, when the first interaction occurs, the processor is configured to activate an application corresponding to the selected notification information, and when the second interaction occurs, the processor is configured to display a content included in the notification information on the display.

6. The electronic apparatus of claim 4, wherein, when the third interaction occurs, the processor is configured to delete the dragged notification information from the display, and when the fourth interaction occurs, the processor is configured to delete the notification information displayed on the display from the display.

7. The electronic apparatus of claim 4, wherein the operation of dragging in the first direction includes an operation of dragging the notification information displayed on the display in a downward direction, and the operation of dragging in the second direction includes dragging the notification information displayed on the display in a leftward or rightward direction.

8. The electronic apparatus of claim 1, wherein the change in notification display option of the first application comprises: changing a form of notification information, displaying additional notification information and changing a content of displayed notification information.

9. The electronic apparatus of claim 1, wherein the processor is further configured to: based on the increase in the preference associated with the first application in response to the first type of user touch interaction, change the notification display option of the first application stored in the memory from the first notification display option to a third notification display that is different from the first notification display option and the second notification display option.

10. The electronic apparatus of claim 1, wherein the processor is further configured to: based on the increase in the preference associated with the first application in response to the first type of user touch interaction, change the notification display option of the first application stored in the memory from the first notification display option to a third notification display option in which a format of text in the notification information is changed from a format in the first notification display option.

11. The electronic apparatus of claim 1, wherein the processor is further configured to: based on the increase in the preference associated with the first application in response to the first type of user touch interaction, change the notification display option of the first application stored in the memory from the first notification display option to a third notification display option and increase an intensity of vibration or sound of the electronic apparatus generated for the notification information associated with the first application.

12. A method for displaying a notification information of an electronic apparatus, comprising:

receiving notification information from a plurality of applications;

simultaneously displaying the received notification information from the plurality of applications based on a preference associated with each of the plurality of applications and based on notification display options of the applications that generate the notification information, wherein each of the notification display options comprises a form of the notification information to be subsequently displayed;

receiving a first type of user touch interaction or a second type of user touch interaction on a first displayed notification information regarding a first application of the plurality of applications, wherein the first notification information is displayed according to a first notification display option associated with the first application, displaying the first notification information according to the first notification display option includes displaying the first notification information without grouping the first notification information with other displayed notification information into one notification information;

based on a first type of user touch interaction being received, increasing the preference for the application that provides the selected notification information, and wherein the first type of interaction comprises a first interaction of selecting the notification information and in response thereto execute application corresponding to the selected notification information, and second interaction of dragging said the notification information in a first direction and in response thereto the electronic apparatus displays corresponding content of the notification as a preview, based on a second type of user touch interaction being received, decreasing the preference for the application that provides the selected notification information, and the second type of interaction comprises a third interaction of dragging the notification information in a second direction and in response thereto delete the notification information and a fourth interaction of selecting a delete menu to delete the notification information; and based on the decrease in the preference associated with the first application in response to the second type of user touch interaction, changing the notification display option of the first application from the first notification display option to a second notification display option different from the first notification display option; and based on detecting an event for displaying notification information regarding the first application after the first notification information is displayed with the first notification display option, displaying second notification information regarding the first application according to the second notification display option, wherein displaying the second notification information according to the second notification display option includes grouping the second notification information with one or more other notifications regarding the first application as one notification information, and based on the preference associated with the first application being changed, adjusting the intensity of at least one of the vibration and sound corresponding to notification information regarding a first application.

13. The method of claim 12, wherein the change in notification display option of the application comprises at least one of: changing a form of notification information, displaying additional notification information, and changing a content of displayed notification information.

14. The method of claim 13, wherein the changing the form of notification information comprises at least one of: displaying at least one notification information displayed on the display wherein the notification information is distinguished from other notification information; changing an order of displaying the notification information; separating a portion of the content included in the notification information and displaying the separated portion of the content included in the notification information as separate notification information; and changing an intensity of vibration or sound of the electronic apparatus that generates the notification information.

15. The method of claim 12, wherein the first type of user touch interaction comprises a first interaction of selecting one of the notification information, and a second interaction of dragging one of the notification information in a first direction, and the second type of user touch interaction comprises a third interaction of dragging one of the notification information in a second direction, and a fourth interaction of selecting a delete menu to delete the notification information.

16. The method of claim 15, further comprising:
when the first interaction occurs, activating an application corresponding to the selected notification information; and
when the second interaction occurs, displaying a content included in the notification information.

17. The method of claim 15, wherein the dragging in the first direction includes dragging the notification information displayed on the display in a downward direction, and
the dragging in the second direction includes dragging the notification information displayed on the display in a leftward or rightward direction.

18. The method of claim 15, further comprising:
when the third interaction occurs, deleting the dragged notification information; and
when the fourth interaction occurs, deleting the displayed notification information.

19. A non-transitory computer readable medium storing a program which, when executed, causes a processor to perform operations of a method for displaying notification information of an electronic apparatus, the method for displaying the notification information comprising:

receiving notification information from a plurality of applications;

simultaneously displaying the received notification information from the plurality of applications based on a preference associated with each of the plurality of applications and based on notification display options of the applications that generate the notification information, wherein each of the notification display options comprises a form of the notification information to be subsequently displayed;

receiving a first type of user touch interaction or a second type of user touch interaction on a first displayed notification information regarding a first application of the plurality of applications, wherein the first notification information is displayed according to a first notification display option associated with the first application, displaying the first notification information according to the first notification display option includes displaying the first notification information without grouping the first notification information with other displayed notification information into one notification information;

based on a first type of user touch interaction being received, increasing the preference for the application that provides the selected notification information, and wherein the first type of interaction comprises a first interaction of selecting the notification information and in response thereto execute application corresponding to the selected notification information, and second interaction of dragging said the notification information in a first direction and in response thereto the electronic apparatus displays corresponding content of the notification as a preview, based on a second type of user touch interaction being received, decreasing the preference for the application that provides the selected notification information, and the second type of interaction comprises a third interaction of dragging the notification information in a second direction and in response thereto delete the notification information and a fourth interaction of selecting a delete menu to delete the notification information; and based on the decrease in the preference associated with the first application in response to the second type of user touch interaction, changing the notification display option of the first application from the first notification display option to a second notification display option different from the first notification display option; and based on detecting an event of displaying notification information regarding the first application after the first notification information is displayed with the first notification display option, displaying second notification information regarding the first application according to the second notification display option, wherein displaying the second notification information according to the second notification display option includes grouping the second notification information with one or more other notifications regarding the first application as one notification information, and based on the preference associated with the first application being changed, adjusting the intensity of at least one of the vibration and sound corresponding to notification information regarding a first application.

* * * * *